(12) United States Patent
Gupta et al.

(10) Patent No.: US 9,292,837 B2
(45) Date of Patent: Mar. 22, 2016

(54) TASK PROCESSING AND RESOURCE SHARING IN A DISTRIBUTED WIRELESS SYSTEM

(71) Applicant: Aruba Networks, Inc., Sunnyvale, CA (US)

(72) Inventors: Manoj Gupta, Santa Clara, CA (US); Santashil PalChaudhuri, Kolkata (IN); Partha Narasimhan, Santa Clara, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 257 days.

(21) Appl. No.: 13/959,603

(22) Filed: Aug. 5, 2013

(65) Prior Publication Data

US 2015/0038188 A1  Feb. 5, 2015

(51) Int. Cl.
*H04W 40/00* (2009.01)
*G06Q 10/10* (2012.01)
*H04W 24/08* (2009.01)

(52) U.S. Cl.
CPC ........... *G06Q 10/1097* (2013.01); *H04W 24/08* (2013.01)

(58) Field of Classification Search
USPC ........... 455/445, 449, 453, 455, 456.5, 456.6, 455/41.1–41.3; 370/310–320; 709/201, 709/223, 249
See application file for complete search history.

(56) References Cited

U.S. PATENT DOCUMENTS

| | | | |
|---|---|---|---|
| 8,140,104 B2 * | 3/2012 | Douglas et al. | 455/522 |
| 8,502,733 B1 * | 8/2013 | Negus et al. | 342/359 |
| 2012/0120892 A1 * | 5/2012 | Freda et al. | 370/329 |
| 2012/0214526 A1 * | 8/2012 | Selen et al. | 455/507 |
| 2014/0364075 A1 * | 12/2014 | Sullivan | 455/166.1 |

* cited by examiner

*Primary Examiner* — Fayyaz Alam

(74) *Attorney, Agent, or Firm* — Mannava & Kang, P.C.

(57) ABSTRACT

The present disclosure discloses a system and method for task processing and resource sharing in a distributed wireless system. The system includes a processor and a memory storing instructions that, when executed, cause the system to: identify a plurality of nodes in a distributed wireless system, each node of the plurality of nodes associated with a radio frequency neighborhood, the radio frequency neighborhood of one node including one or more other nodes that hear beacons from the one node; assign a task to the plurality of nodes; split the task into a plurality of subtasks; assign the plurality of subtasks to the plurality of nodes; receive a plurality of subtask processing results from the plurality of nodes; and combine the plurality of subtask processing results to generate a task processing result for the task.

27 Claims, 22 Drawing Sheets

1) EXAMPLE GRAPH & PARAMETERS

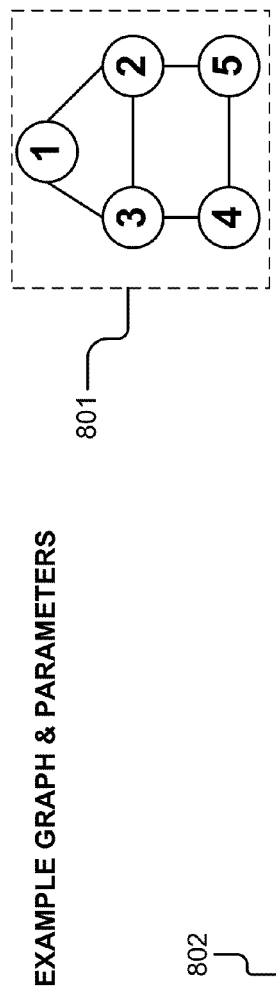

| | Node 1 | Node 2 | Node 3 | Node 4 | Node 5 |
|---|---|---|---|---|---|
| Node ID | $I_1=1$ | $I_2=2$ | $I_3=3$ | $I_4=4$ | $I_5=5$ |
| Neighbor Set | $R_1=\{2, 3\}$ | $R_2=\{1, 3, 5\}$ | $R_3=\{1, 2, 4\}$ | $R_4=\{3, 5\}$ | $R_5=\{2, 4\}$ |
| Neighbor set (with smaller node IDs) | $T_1=\{\phi\}$ ($T_1$ is an empty set) | $T_2=\{1\}$ | $T_3=\{1, 2\}$ | $T_4=\{3\}$ | $T_5=\{2, 4\}$ |

2) INITIALIZATION PROCESS

| | Node 1 | Node 2 | Node 3 | Node 4 | Node 5 |
|---|---|---|---|---|---|
| Clique set | $S_1=\{I_1\}$ | $S_2=\{I_2\}$ | $S_3=\{I_3\}$ | $S_4=\{I_4\}$ | $S_5=\{I_5\}$ |
| Clique ID | $C_1=I_1$ | $C_2=I_2$ | $C_3=I_3$ | $C_4=I_4$ | $C_5=I_5$ |
| Owner of clique set | $I_1$ | $I_2$ | $I_3$ | $I_4$ | $I_5$ |

FIG. 8A

4) CLIQUE SETS

| Clique set | $S_1, S_2, S_3=\{I_1, I_2, I_3\}$ | $S_4, S_5=\{I_4, I_5\}$ |
|---|---|---|
| Clique ID | $C_1, C_2, C_3=I_1$ | $C_4, C_5=I_4$ |
| Owner of clique set | $I_1$ | $I_4$ |

880

890
892

TASK PROCESSING AND RESOURCE SHARING IN A DISTRIBUTED WIRELESS SYSTEM

FIELD

The present disclosure relates to processing tasks in a wireless system. In particular, the present disclosure relates to a system and method for using a set of nodes to process tasks and share resource in a distributed wireless system.

BACKGROUND

Communications in a wireless network can be interfered by radio frequency devices. For example, microwave ovens, cordless phones and adjacent Wi-Fi networks are potential sources producing continuous or intermittent interference. In order to learn potential interference, network devices such as access points periodically scan the radio frequency environment. The radio frequency environment is a frequency range divided into multiple channels. Each access point scans all the available channels, which is time consuming and not efficient. For example, the time required to scan the channels is proportional to the number of channels, and a considerable amount of time is needed before an access point can scan the same channel again. Besides, a primary duty of an access point is to serve clients in an assigned channel, which requires the access point to spend as less resource as possible on scanning the channels; however, frequent channel scanning can provide updated channel information and is beneficial to wireless intrusion detection and prevention.

A load balancing feature optimizes network resources by distributing clients across different channels. If an access point receives an association request from a new client, the access point determines whether the load balancing feature is enabled. If so, the access point sends a response with an error code to the new client and rejects the new client's association request. If the new client resends the association request to the same access point again after receiving the error code, the new client is admitted by the access point. If the new client's association request has been rejected by two access points, the new client will be admitted by any access point on its third try. However, this load balancing approach depends on the client's behavior and is unpredictable from the perspective of the access point.

BRIEF DESCRIPTION OF THE DRAWINGS

The present disclosure may be best understood by referring to the following description and accompanying drawings that are used to illustrate embodiments of the present disclosure.

FIGS. 8A-8F are graphic representations illustrating a process for identifying exemplary clique sets according to embodiments of the present disclosure.

DETAILED DESCRIPTION

Figure 1:
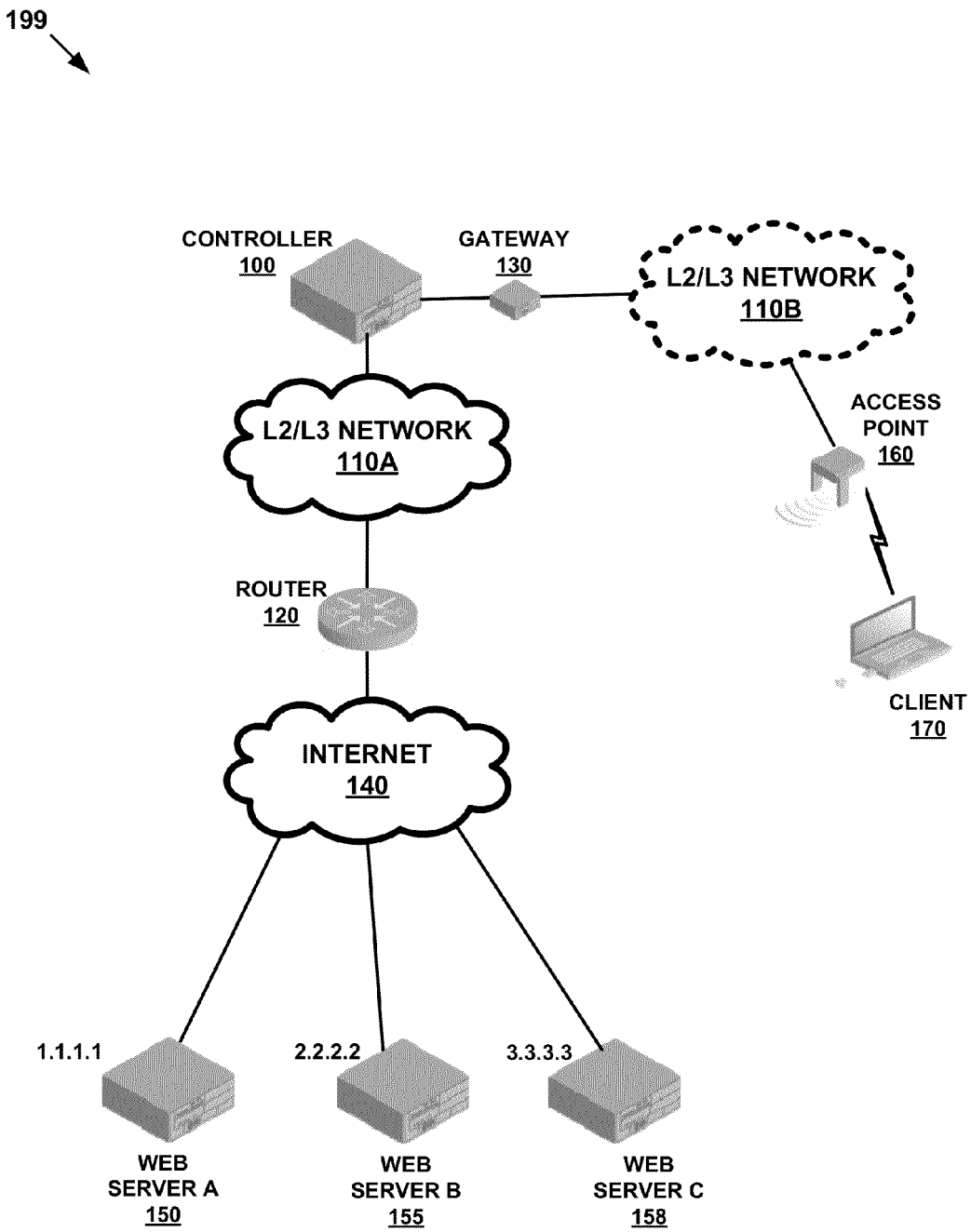
FIG. 1 is a block diagram illustrating an exemplary network environment according to embodiments of the present disclosure.

In the following description, several specific details are presented to provide a thorough understanding. While the context of the disclosure is directed to task processing and resource sharing in a distributed wireless system, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to task processing and resource sharing in a distributed wireless system. In particular, the present disclosure relates to a system and method for processing tasks and sharing resource in a distributed wireless system using a set of nodes. Specifically, the system achieves efficient task processing and resource sharing by coordinating neighboring network devices to form a plurality of nodes, where each node is associated with a radio frequency (RF) neighborhood that includes the other nodes. For a node in the plurality of nodes, a RF neighborhood of the node includes the other nodes capable of hearing beacons from the node. The system splits a task into subtasks and assigns the subtasks to the plurality of nodes. Each node performs at least one subtask, and the entire task is completed by the plurality of nodes together. The system receives a plurality of subtask processing results from the plurality of nodes, and combines the plurality of subtask processing results to generate a task processing result. This task splitting and processing by a plurality of nodes improves resource efficiency and network performance. For example, by performing the subtasks in parallel by the plurality of nodes, the time required to complete the entire task can be reduced.

According to some embodiments of the present disclosure, the system coordinates neighboring network devices that have a similar view or the same view of the communication network to identify a plurality of nodes. In some embodiments, the plurality of nodes is a clique set. The system identifies a clique set including the neighboring network devices, where each neighboring network device is a node in the clique set. The system assigns a task to the clique set and processes the task using the clique set. For example, the system splits the task into a plurality of subtasks and assigns the plurality of subtasks to the nodes in the clique set, where each node processes at least one subtask.

In some embodiments, the task is a channel scanning task. The system processes the channel scanning task using the plurality of nodes by: determining a list of channels to be scanned; determining one or more channels from the list to be scanned by each node; and instructing each node to scan the one or more channels assigned to the respective node. By splitting the channel scanning task among all the nodes in the plurality of nodes, the time that each node spends on the channel scanning can be reduced. Therefore, each channel in the list can be scanned more frequently, which is beneficial for the wireless intrusion detection and prevention.

In some embodiments, the task is a load balancing task. The system processes the load balancing task using the plurality of nodes by: receiving an association request from a client; determining a number of associated clients for each node; determining a node with a minimal number of associated clients; determining an owner node in the plurality of nodes; and instructing either the node with the minimal number of associated clients or the owner node to respond to the client's association request. By balancing clients across the available channels, the system can use the resource of radio frequency bandwidth more efficiently and therefore improve network performance.

In some embodiments, the system identifies one or more clique sets by: initializing one or more node clique sets in the distributed wireless system; exchanging requests (e.g., ADD messages, RESET messages) and responses (e.g., ACCEPT messages, REJECT messages) among the one or more node clique sets to generate one or more updated clique sets; determining whether an identification process for clique sets converges; if the identification process does not converge, continue to exchange requests (e.g., ADD messages, RESET messages) and responses (e.g., ACCEPT messages, REJECT messages) among the one or more node clique sets and/or the one or more updated clique sets; and if the identification process converges, identifying the one or more clique sets as one or more unique clique sets that exist at the convergence of the identification process.

Computing Environment

FIG. 1 shows an exemplary digital network environment 199 according to embodiments of the present disclosure. FIG. 1 includes at least one or more network controller (such as controller 100), one or more access points (such as access point 160), one or more client devices (such as client 170), a layer 2 or layer 3 network 110, a routing device (such as router 120), a gateway 130, Internet 140, and one or more web servers (such as web server A 150, web server B 155, and web server C 158), etc. The components of the digital network environment 199 are communicatively coupled to each other. In some embodiments, the digital network environment 199 may include other components not shown in FIG. 1 such as an email server, a cloud-based storage device, etc.

The controller 100 is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc. In some embodiments, the controller 100 is an optional component in the digital network environment 199.

Moreover, assuming that a number of access points, such as access point 160, are interconnected with the network controller 100. Each access point 160 may be interconnected with zero or more client devices via either a wired interface or a wireless interface. In this example, for illustration purposes only, assuming that the client 170 is associated with the access point 160 via a wireless link. An access point 160 generally refers to a network device that allows wireless clients to connect to a wired network. Access points 160 usually connect to a controller 100 via a wired network or can be a part of a controller 100 in itself. For example, the access point 160 is connected to the controller 100 via an optional L2/L3 network 110B.

Furthermore, the controller 100 can be connected to the router 120 through zero or more hops in a layer 3 or layer 2 network (such as L2/L3 Network 110A). The router 120 can forward traffic to and receive traffic from the Internet 140. The router 120 generally is a network device that forwards data packets between different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A data packet is typically forwarded from one router 120 to another router 120 through the Internet 140 until the packet gets to its destination.

The gateway 130 is a network device that passes network traffic from local subnet to devices on other subnets. In some embodiments, the gateway 130 may be connected to a controller 100 or be a part of the controller 100 depending on the configuration of the controller 100. In some embodiments, the gateway 130 is an optional component in the digital network environment 199.

Web servers 150, 155, and 158 are hardware devices and/or software modules that facilitate delivery of web content that can be accessed through the Internet 140. For example, the web server A 150 may be assigned an IP address of 1.1.1.1 and used to host a first Internet website (e.g., www.yahoo.com); the web server B 155 may be assigned an IP address of 2.2.2.2 and used to host a second Internet website (e.g., www.google.com); and, the web server C 158 may be assigned an IP address of 3.3.3.3 and used to host a third Internet website (e.g., www.facebook.com).

The client 170 may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only one client 170 is illustrated in FIG. 1, a plurality of clients 170 can be included in FIG. 1.

System for Task Processing and Resource Sharing

Figure 2:
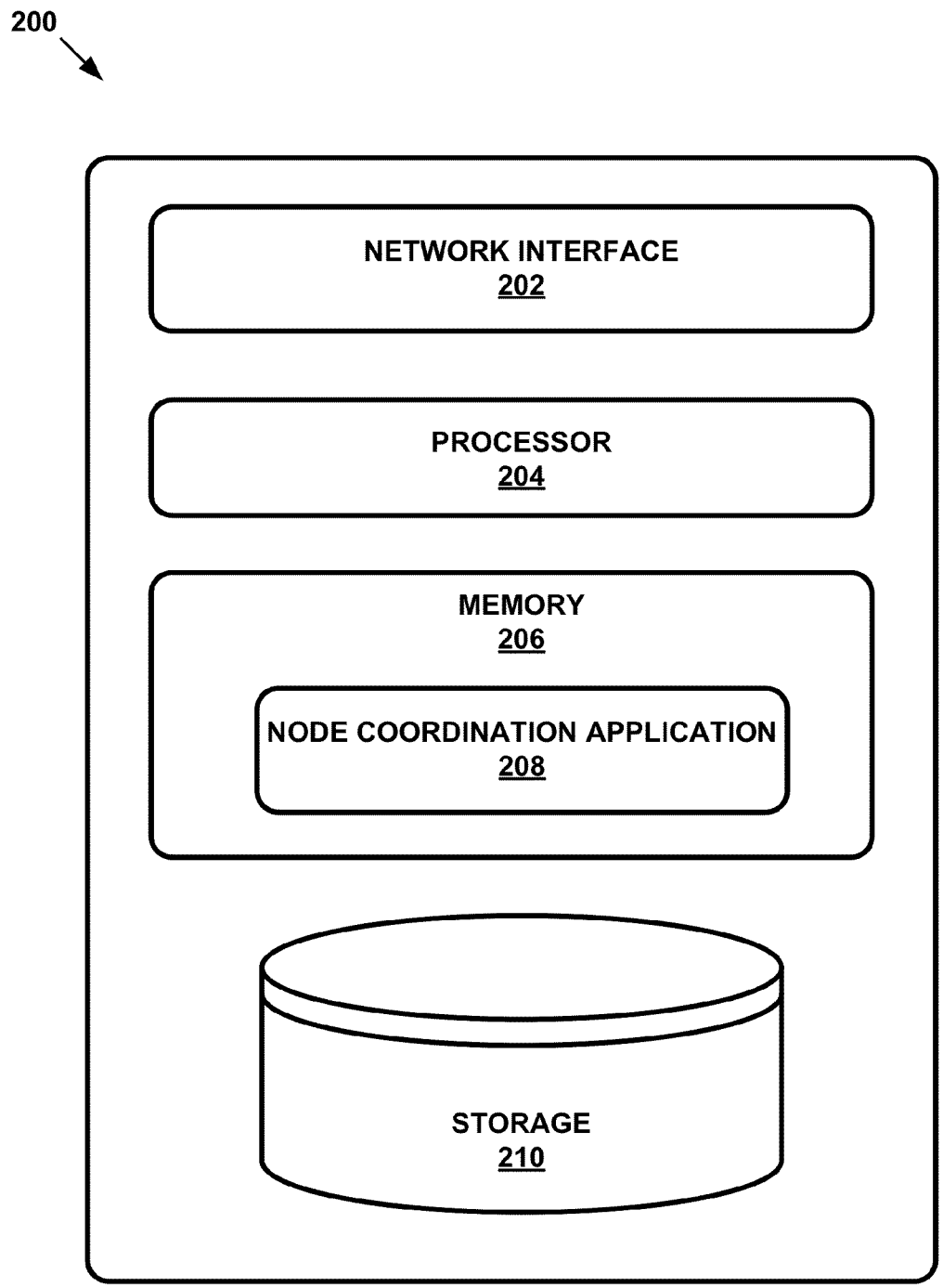
FIG. 2 is a block diagram illustrating an exemplary network device according to embodiments of the present disclosure.

FIG. 2 is a block diagram illustrating an example network device system 200 for task processing and resource sharing according to embodiments of the present disclosure. The network device 200 may be used as a network switch, a network router, a network controller, a network server, an access point, etc. Further, the network device 200 may serve as a node in a distributed or a cloud computing environment. According to embodiments of the present disclosure, network services provided by the network device 200, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

In some embodiments, the network device 200 includes a network interface 202 capable of communicating to a wired network, a processor 204, a memory 206 and a storage device 210. The components of the network device 200 are communicatively coupled to each other.

The network interface 202 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, the network interface 202 may be software-defined and programmable, for example, via an Application Programming Interface (API), and thus allowing for remote control of the network device 200.

The processor 204 includes an arithmetic logic unit, a microprocessor, a general purpose controller or some other processor array to perform computations and provide electronic display signals to a display device. Processor 204 processes data signals and may include various computing architectures including a complex instruction set computer (CISC) architecture, a reduced instruction set computer (RISC) architecture, or an architecture implementing a combination of instruction sets. Although FIG. 2 includes a single processor 204, multiple processors 204 may be included. Other processors, operating systems, sensors, displays and physical configurations are possible. In some embodiments, the processor 204 includes a networking processor core that is capable of processing network data traffic.

The memory 206 stores instructions and/or data that may be executed by the processor 204. The instructions and/or data may include code for performing the techniques described herein. The memory 206 may be a dynamic random access memory (DRAM) device, a static random access memory (SRAM) device, flash memory or some other memory device. In some embodiments, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 206 stores a node coordination application 208. The node coordination application 208 can be code and routines for coordinating nodes in a wireless system to perform tasks and share network resource. In some embodiments, a node can be an access point 160. In some other embodiments, a node can be a controller 100, a router 120, a gateway 130, a switch or any other network device. In some embodiments, the node coordination application 208 can be implemented using hardware including a field-programmable gate array (FPGA) or an application-specific integrated circuit (ASIC). In some other embodiments, the node coordination application 208 can be implemented using a combination of hardware and software. In some embodiments, the node coordination application 208 may be stored in a combination of the network devices, or in one of the network devices. The node coordination application 208 is described below in more detail with reference to FIGS. 3-7.

The storage device 210 can be a non-transitory memory that stores data for providing the functionality described herein. The storage device 210 may be a dynamic random access memory (DRAM) device, a static random access memory (SRAM) device, flash memory or some other memory devices. In some embodiments, the storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Node Coordination Application

Figure 3:
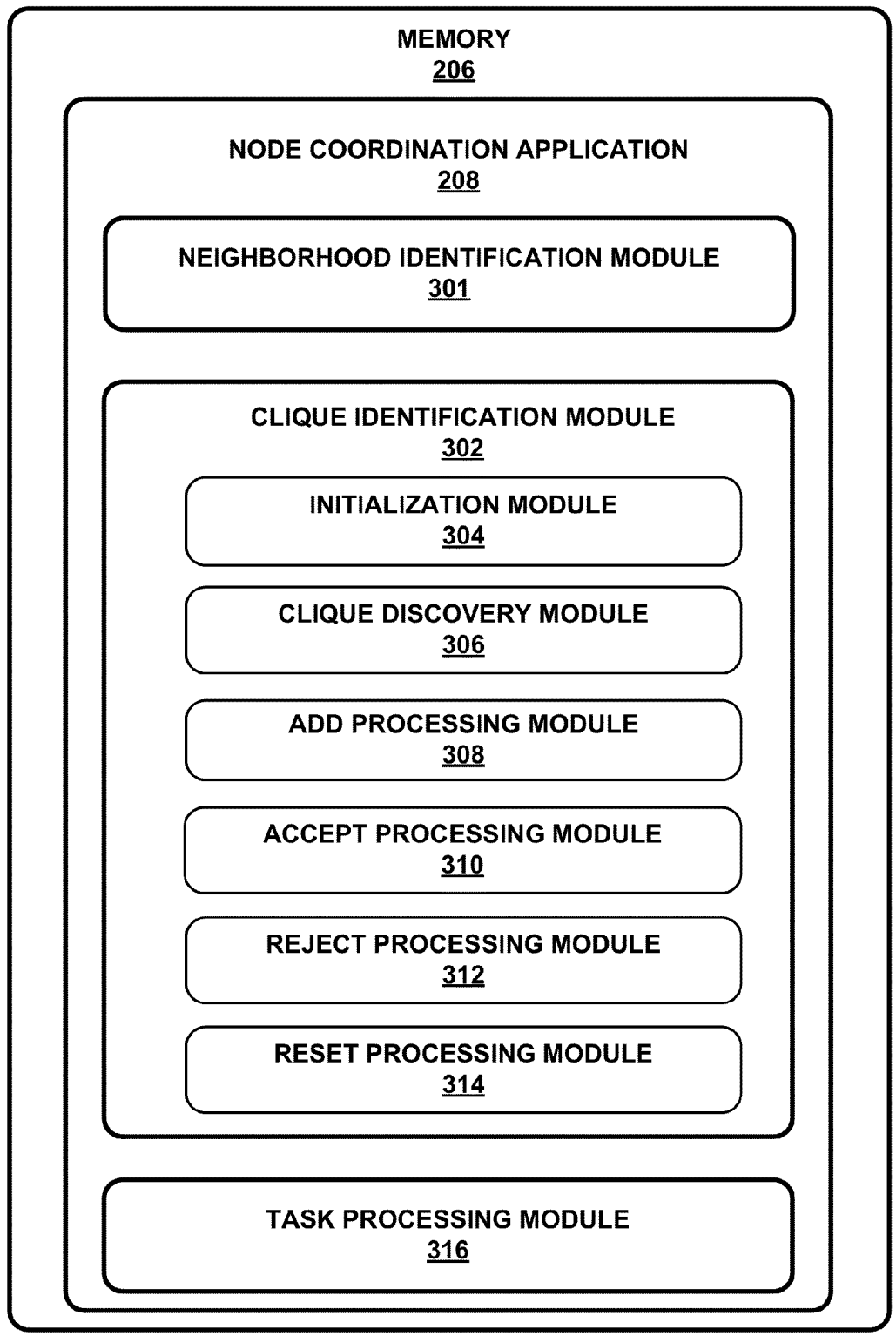
FIG. 3 is a block diagram illustrating an exemplary node coordination application stored on a memory according to embodiments of the present disclosure.

FIG. 3 illustrates an exemplary node coordination application 208 stored on a memory 206 according to embodiments of the present disclosure. The node coordination application 208 includes a neighborhood identification module 301, a clique identification module 302 and a task processing module 316.

The neighborhood identification module 301 can be software including routines for identifying a plurality of nodes. In some embodiments, the neighborhood identification module 301 can be a set of instructions executable by the processor 204 to provide the functionality described below for identifying a plurality of nodes. In some other embodiments, the neighborhood identification module 301 can be stored in the memory 206 of the network device 200 and can be accessible and executable by the processor 204. The neighborhood identification module 301 may be adapted for cooperation and communication with the processor 204 and other components of the network device 200 such as the network interface 202, the storage 210, etc.

In some embodiments, the neighborhood identification module 301 determines a list of available nodes in a wireless distributed system, and identifies a plurality of nodes from the list of available nodes, where each identified node in the plurality of nodes has a radio frequency (RF) neighborhood that includes the other nodes. For an identified node in the plurality of nodes, a RF neighborhood of the identified node includes the other nodes, and the other nodes are capable of hearing beacons from the node. In other words, each identified node in the plurality of nodes is in the RF neighborhoods of the other nodes and is capable of hearing beacons from the other nodes in the plurality of nodes.

Each two nodes in the plurality of nodes are RF neighbors. Two nodes are RF neighbors if they have a similar view of a communication network. For example, two nodes are neighbors if they have the same view of the communication network. In another example, two nodes are located close to each other so that they are neighbors and operate in the same radio frequency environment. In some embodiments, two nodes are RF neighbors if a client 170 which can connect to one node can also connect to the other node. In some embodiments, two nodes are RF neighbors if a task (e.g., a channel scanning task or a load balancing task) which can be processed by one node can also be processed by the other node. For example, two nodes are neighbors if the same result is produced for the same task being performed on either node. In some embodiments, two nodes are RF neighbors if their radio frequency spectrums are substantially overlapped with each other.

In some embodiments, any node in the identified plurality of nodes is associated with a RF spectrum that is substantially overlapped with RF spectrums of the other nodes. For example, for each two nodes in the plurality of nodes, a spectrum associated with one node is at least 70% overlapped with a spectrum associated with the other node. In some embodiments, the plurality of nodes can be identified manually. In some other embodiments, the plurality of nodes can be identified automatically. For example, the plurality of nodes can be a clique set, which is identified automatically by performing operations described below.

In some embodiments, a first node that generates and sends an ADD message to a second node is in the RF neighborhood of the second node, and the second node is also in the RF neighborhood of the first node. The first node and the second node are RF neighbors. The ADD message is described below in more detail.

In some embodiments, each node in the distributed wireless system is identified by a unique node identifier (ID). For example, a node ID is a unique number assigned to a node. In other examples, a node ID can be any unique identifier (e.g., a unique symbol) assigned to a node. The plurality of nodes has an owner node, which is a node having the lowest node ID. It should be understood to one skilled in the art that in some embodiments an owner node can be any node in the plurality of nodes such as a node having the highest node ID. To simplify the description hereinafter, the owner node is assumed to be the node having the lowest node ID.

The clique identification module 302 can be software including routines for identifying one or more clique sets. In some embodiments, the clique identification module 302 can be a set of instructions executable by the processor 204 to provide the functionality described below for identifying one or more clique sets. In some other embodiments, the clique identification module 302 can be stored in the memory 206 of the network device 200 and can be accessible and executable by the processor 204. The clique identification module 302 may be adapted for cooperation and communication with the processor 204 and other components of the network device 200 such as the network interface 202, the storage 210, etc.

A clique set can be a set of nodes with any two nodes in the set being neighbors. In some embodiments, a clique set includes a single node, which is also referred to as a node clique set as described below in more detail.

In some embodiments, an undirected graph G(V, E) is used to represent nodes available in a distributed wireless system, where the set "V" includes all the vertices in the graph with each vertex representing one node, and the set "E" represents all the edges in the graph. If two nodes are neighbors, the two vertices representing the two nodes are connected by an undirected edge in the graph. A clique set (represented by a symbol "S") is a subset of the set "V" (e.g., $S \subseteq V$), where any two vertices in the clique set "S" are connected by an edge (e.g., the nodes in the clique set are pairwise connected to each other). The size of the clique set "S" is the number of vertices included in the set "S." Example graphs and clique sets are illustrated with reference to FIGS. 8A, 8F and 9A-9F.

Each node is a member of only one clique set, and cannot be a member of two unique clique sets simultaneously. For example, if a node is a member of a first clique set, the node cannot be a member of a second clique set that is different from the first clique set. Each clique set has an owner node, which is a node in the clique set having the lowest node ID. Each clique set is identified by a clique ID. In some embodiments, the clique ID is the same as the owner node ID. It should be understood to one skilled in the art that in some embodiments an owner node can be any node in the clique set such as a node having the highest node ID.

In some embodiments, a node can obtain information relevant to its own clique set or other clique sets through external mechanisms. For example, a node can obtain information describing an owner node, a clique ID and members of any clique set via a report that complies with the IEEE 802.11k standard or retrieving the relevant information from a central database.

In some embodiments, the clique identification module 302 includes an initialization module 304, a clique discovery module 306, an ADD processing module 308, an ACCEPT processing module 310, a REJECT processing module 312 and a RESET processing module 314.

The initialization module 304 can be software including routines for initializing clique sets in a distributed wireless system. In some embodiments, the initialization module 304 determines nodes available in a distributed wireless system and neighbor relationship between the nodes. For example, the initialization module 304 detects presence of nodes in the distributed wireless system, and determines each node's neighbors through external mechanisms. Example external mechanisms include, but are not limited to, a report that complies with the IEEE 802.11k standard and/or searching a database that stores information relevant to node presence and neighbor relationship, etc. The initialization module 304 initializes clique sets in the distributed wireless system so that: (1) each single node forms a clique set, where a clique set including a single node is also referred to as a node clique set; (2) the single node in the node clique set is the owner node of the node clique set; and (3) a clique ID for the node clique set is the node ID of the owner node. The initialization module 304 sends the initialized clique sets to the clique discovery module 306. For example, the initialization module 304 sends all the node clique sets to the clique discovery module 306.

The clique discovery module 306 can be software including routines for discovering a clique set associated with a node. In some embodiments, the clique discovery module 306 receives node clique sets initialized by the initialization module 304, with each node clique set including a single node. For each node clique set, the clique discovery module 306 identifies an owner node which is also the single node in the node clique set, and determines a neighbor set of the owner node, where the neighbor set includes all the neighbor nodes of the owner node. The clique discovery module 306 determines a neighbor subset of the owner node from the neighbor set, where each neighbor node in the neighbor subset has a node ID smaller than the owner node ID.

At the owner node of the node clique set, which is the single node in the node clique set, the clique discovery module 306 generates an ADD message and sends the ADD message from the owner node to each neighbor node in the neighbor subset of the owner node. For example, at each initialized node clique set including a single node, the clique discovery module 306 ranks the neighbor nodes in the neighbor subset according to the node IDs of the neighbor nodes, and sends an ADD message to each neighbor node in the neighbor subset according to the rankings of the neighbor nodes. For example, the clique discovery module 306 sends an ADD message to a neighbor node having the lowest node ID from the neighbor subset. If the node clique set is rejected by an owner node of a clique set associated with the neighbor node as described below in more detail, the clique discovery module 306 sends another ADD message to another neighbor node having the second lowest node ID in the neighbor subset. If the node clique set is accepted by an owner node of a clique set associated with the neighbor node as described below in more detail, the clique discovery module 306 does not send ADD messages to other neighbor nodes in the neighbor subset anymore.

An ADD message, which is generated by an owner node of a node clique set and sent to a neighbor node of the owner node, indicates that the node clique set requests to join a clique set associated with the neighbor node. For example, assume that: (1) a clique set includes Nodes 1 and 2 with Node 1 being the owner node; (2) a node clique set includes a single node (Node 3); and (3) Node 2 is in the neighbor subset of Node 3 (e.g., Nodes 2 and 3 are neighbors). A clique discovery module 306 stored on Node 3 generates an ADD message and sends the ADD message to Node 2, indicating Node 3's request to join the clique set associated with Node 2. If Node 3 is also in a neighbor set of Node 1 (e.g., Node 3 also being a neighbor of Node 1), indicating Nodes 1, 2 and 3 are fully connected to each other in a graph, Node 3's ADD request is accepted by Node 1 and Nodes 1, 2 and 3 are combined to form a clique set. An example process is illustrated with reference to FIG. 9C.

In some embodiments, the clique discovery module 306 determines whether the identification process for clique sets converges. For example, the clique discovery module 306 determines whether all the neighbor nodes in the neighbor subset of each owner node in each node clique set are already processed, where the neighbor nodes in the neighbor subset have node IDs smaller than the respective owner node ID. If all the neighbor nodes in the neighbor subset of each owner node are processed, or each node is processed to become either an owner node of a clique set or a non-owner node of a clique set with an owner node ID smaller than the non-owner node's ID, the clique discovery module 306 determines that the identification process for clique sets converges. The clique discovery module 306 determines one or more unique clique sets that exist at the convergence of the identification process, and creates one or more identified clique sets as the one or more unique clique sets. The clique discovery module 306 sends the one or more identified clique sets to the task processing module 316. However, if the identification process does not converge, the clique discovery module 306 selects another node clique set that has not been processed and continues to process the selected node clique set by performing operations similar to those described above. For example, the clique discovery module 306 identifies a neighbor subset of the owner node of the selected node clique set and sends ADD messages to nodes in the neighbor subset.

The ADD processing module 308 can be software including routines for processing ADD messages. In some embodiments, the ADD processing module 308 at a first node receives one or more ADD messages either directly or indirectly from one or more second nodes, where each second node forms a node clique set, generates and sends one ADD message to the first node directly or via another node. The ADD processing module 308 determines a first clique set associated with the first node and an owner node of the first clique set. The ADD processing module 308 determines whether the first node is the owner node of the first clique set.

If the first node itself is the owner node of the first clique set, the ADD processing module 308 processes the one or more ADD messages at the first node. For example, the ADD processing module 308 determines a node with the lowest node ID among the one or more second nodes, selects to process the ADD message received from the node with the lowest node ID, and rejects the other ADD messages received from other second nodes by sending REJECT messages to the corresponding second nodes.

After selecting the node with the lowest node ID to process, the ADD processing module 308 determines whether the node with the lowest node ID is in the neighbor set of each node from the first clique set. For example, the ADD processing module 308 determines whether the node with the lowest node ID is connected to each node of the first clique set in a graph. In another example, the ADD processing module 308 determines whether the node with the lowest node ID is a neighbor of all the nodes in the first clique set. If the node with the lowest node ID is in the neighbor set of each node in the first clique set, the ADD processing module 308 generates an ACCEPT message at the owner node of the first clique set, and sends the ACCEPT message from the owner node to the node with the lowest node ID either directly or via another node. The ACCEPT message indicates the first clique set accepts the node with the lowest node ID among the one or more second nodes to join the first clique set. If the node with the lowest node ID is not in the neighbor set of at least one node in the first clique set, the ADD processing module 308 generates a REJECT message at the owner node, and sends the REJECT message from the owner node to the node with the lowest node ID. The REJECT message indicates the first clique set rejects the node with the lowest node ID among the one or more second nodes to join the first clique set.

For example, assume that: (1) a first clique set includes Nodes 1 and 2 with Node 1 being the owner node; (2) a node clique set includes Node 3; and (3) Nodes 1 and 3 are neighbors. Node 3 sends an ADD message to Node 1. If Node 3 is also a neighbor of Node 2 (indicating Nodes 1, 2 and 3 are fully connected to each other in a graph), Node 1 sends an ACCEPT message to Node 3, causing Nodes 1, 2 and 3 to form a clique set. However, if Node 3 is not a neighbor of Node 2, Node 1 sends a REJECT message to Node 3.

However, if the first node is not the owner node of the first clique set, the ADD processing module 308 forwards the one or more ADD messages from the first node to the owner node of the first clique set. The ADD processing module 308 processes the one or more ADD messages at the owner node of the first clique set by performing operations similar to those described above.

The ACCEPT processing module 310 can be software including routines for processing ACCEPT messages. In some embodiments, at a first owner node of a first clique set, the ADD processing module 308 described above receives an ADD message from a second owner node of the node clique set, and generates an ACCEPT message responsive to the ADD message. The ACCEPT message indicates the first clique set accepts the node clique set's request to join the first clique set. The first owner node updates the first clique set to include the second owner node in the node clique set. For example, an ACCEPT processing module 310 at the first owner node generates an updated first clique set to include all the nodes in the first clique set and the single node in the node clique set, and the clique ID for the updated first clique set is still the node ID of the first owner node.

The ADD processing module 308 at the first owner node sends the ACCEPT message to the ACCEPT processing module 310 at the second owner node of the node clique set. In some embodiments, the first owner node receives an ADD message directly from the second owner node, and sends an ACCEPT message corresponding to the ADD message directly to the second owner node. In some other embodiments, the first owner node receives the ADD message from the second owner node via a neighbor node, where the neighbor node and the first owner node are in the first clique set. The first owner node sends the corresponding ACCEPT message to the neighbor node, causing the neighbor node to forward the ACCEPT message to the second owner node.

At the neighbor node, responsive to receiving the ACCEPT message, the ACCEPT processing module 310 updates a clique set stored on the neighbor node to include all the nodes in the first clique set and the second owner node in the node clique set.

At the second owner node, responsive to receiving the ACCEPT message either directly from the first owner node or via the neighbor node, the ACCEPT processing module 310 generates an updated clique set to include all the nodes in the first clique set and the second owner node in the node clique set. The ACCEPT processing module 310 also determines the clique ID of the updated clique set to be the clique ID of the first clique set. In this case, the updated clique sets stored on the first owner node, the neighbor node and the second owner node is the same clique set, having the first owner node as an owner, the clique ID equal to the first owner node ID and the same member nodes. Afterwards, the first owner node may broadcast the updated clique set to other member nodes in the updated clique set.

The REJECT processing module 312 can be software including routines for processing REJECT messages. In some embodiments, the ADD processing module 308 stored on a first owner node of a first clique set generates a REJECT message to reject a node clique set's request to join the first clique set. The REJECT message generated by the first owner node is a response corresponding to an ADD message from a second owner node of the node clique set. In some embodiments, the first owner node sends the REJECT message directly to the second owner node, because the first owner node receives the ADD message directly from the second owner node. In some other embodiments, because the first owner node receives the ADD message from the second owner node via a neighbor node, the first owner node sends the corresponding REJECT message to the second owner node via the neighbor node.

At the second owner node of the node clique set, responsive to receiving the REJECT message either directly or indirectly from the first owner node of the first clique set, the REJECT processing module 312 determines whether there are remaining neighbor nodes in the neighbor subset that (1) have node IDs smaller than the second owner node ID and (2) have not yet been processed. If so, the REJECT processing module 312 instructs the clique discovery module 306 to select a neighbor node from the remaining neighbor nodes and to send an ADD message to the selected neighbor node.

The RESET processing module 314 can be software including routines for processing RESET messages. In some embodiments, the RESET processing module 314 detects changes of nodes in the distributed wireless system. For example, the RESET processing module 314 detects one or more of: (1) new nodes are added to the wireless system; (2) some existing nodes exit from the wireless system (e.g., some existing nodes are powered off); and (3) some existing nodes move to new locations, etc. The RESET processing module 314 generates a RESET message responsive to the changes of nodes, and sends the RESET message to nodes in the distributed wireless system. The RESET message indicates to reset the clique sets to the initial state, where each node itself forms a node clique set. The RESET processing module 314 instructs the initialization module 304 to initialize the clique sets again, so that each clique set includes a single node and has a clique ID as the node ID of the single node.

The task processing module 316 can be software including routines for processing tasks and/or sharing network resource in a distributed wireless system. In some embodiments, the task processing module 316 can be a set of instructions executable by the processor 204 to provide the functionality described below for processing tasks and/or sharing network resource in a distributed wireless system. In some other embodiments, the task processing module 316 can be stored in the memory 206 of the network device 200 and can be accessible and executable by the processor 204. The task processing module 316 may be adapted for cooperation and communication with the processor 204 and other components of the network device 200 such as the network interface 202, the storage 210, etc.

In some embodiments, the task processing module 316 receives a plurality of nodes from the neighborhood identification module 301, and assigns a task to the plurality of nodes. For example, the task processing module 316 splits the task into disjoint subtasks, and assigns the subtasks to the plurality of nodes, where each node performs at least one of the subtasks. In some examples, the task processing module 316 utilizes the plurality of nodes to perform a channel scanning task, which is described below in more detail with reference to FIG. 6. In some other examples, the task processing module 316 utilizes the plurality of nodes to perform a spectrum load balancing task, which is described below in more detail with reference to FIG. 7. In other examples, the task processing module 316 may utilize the plurality of nodes to perform other tasks.

In some embodiments, the task processing module 316 receives one or more identified clique sets from the clique identification module 302, with each identified clique set including one or more nodes. The task processing module 316 assigns a task to each identified clique set. The task processing module 316 splits the task into disjoint subtasks and assigns the subtasks to member nodes in the clique set, where each member node performs at least one of the subtasks. In some examples, the task processing module 316 utilizes the clique set to perform a channel scanning task, which is described below in more detail with reference to FIG. 6. In some other examples, the task processing module 316 utilizes the clique set to perform a spectrum load balancing task, which is described below in more detail with reference to FIG. 7. In other examples, the task processing module 316 may utilize the clique set to perform other tasks.

Splitting a task among a plurality of nodes (or member nodes in a clique set) improves resource efficiency and network performance. For example, by performing the subtasks by the nodes in parallel, the time required to complete the task can be reduced. The plurality of nodes (or the member nodes in the clique set) can be coordinated to share network resource more efficiently. For example, the plurality of nodes (or the member nodes in the clique set) can cooperate to perform spectrum load balancing in order to share available radio frequency bandwidth more efficiently, which is described below in more detail with reference to FIG. 7.

Processes for Task Processing and Resource Sharing

Figure 4A:
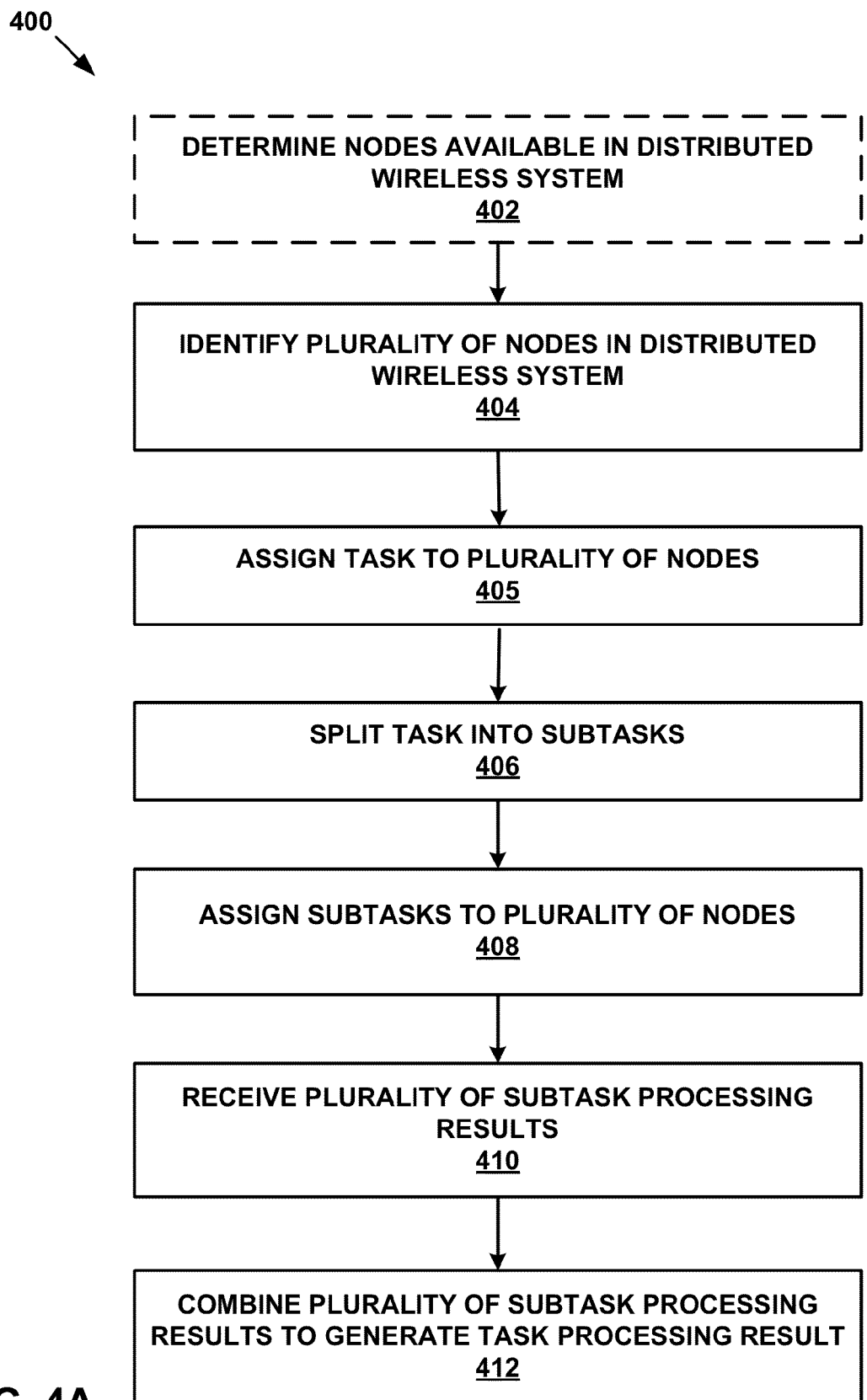
FIG. 4A illustrates an exemplary process for processing tasks and sharing network resource according to embodiments of the present disclosure.

FIG. 4A is a flowchart illustrating an exemplary process 400 for processing tasks and sharing network resource according to embodiments of the present disclosure. During operation, the neighborhood identification module 301 optionally determines nodes available in a distributed wireless system (operation 402). Operation 402 is depicted using a dashed line to indicate it is an optional feature in the exemplary process 400. The neighborhood identification module 301 identifies a plurality of nodes in the distributed wireless system (operation 404), where each node in the plurality of nodes has a RF neighborhood including the other nodes in the plurality of nodes. A RF neighborhood of one node includes the other nodes that hear beacons from the one node. The task processing module 316 assigns a task to the plurality of nodes (operation 405), and splits the task into subtasks (operation 406). The task processing module 316 assigns the subtasks to the plurality of nodes (operation 408). In some embodiments, each node performs at least one subtask. The task processing module 316 receives a plurality of subtask processing results from the plurality of nodes (operation 410), and combines the plurality of subtask processing results to generate a task processing result for the task (operation 412).

Figure 4B:
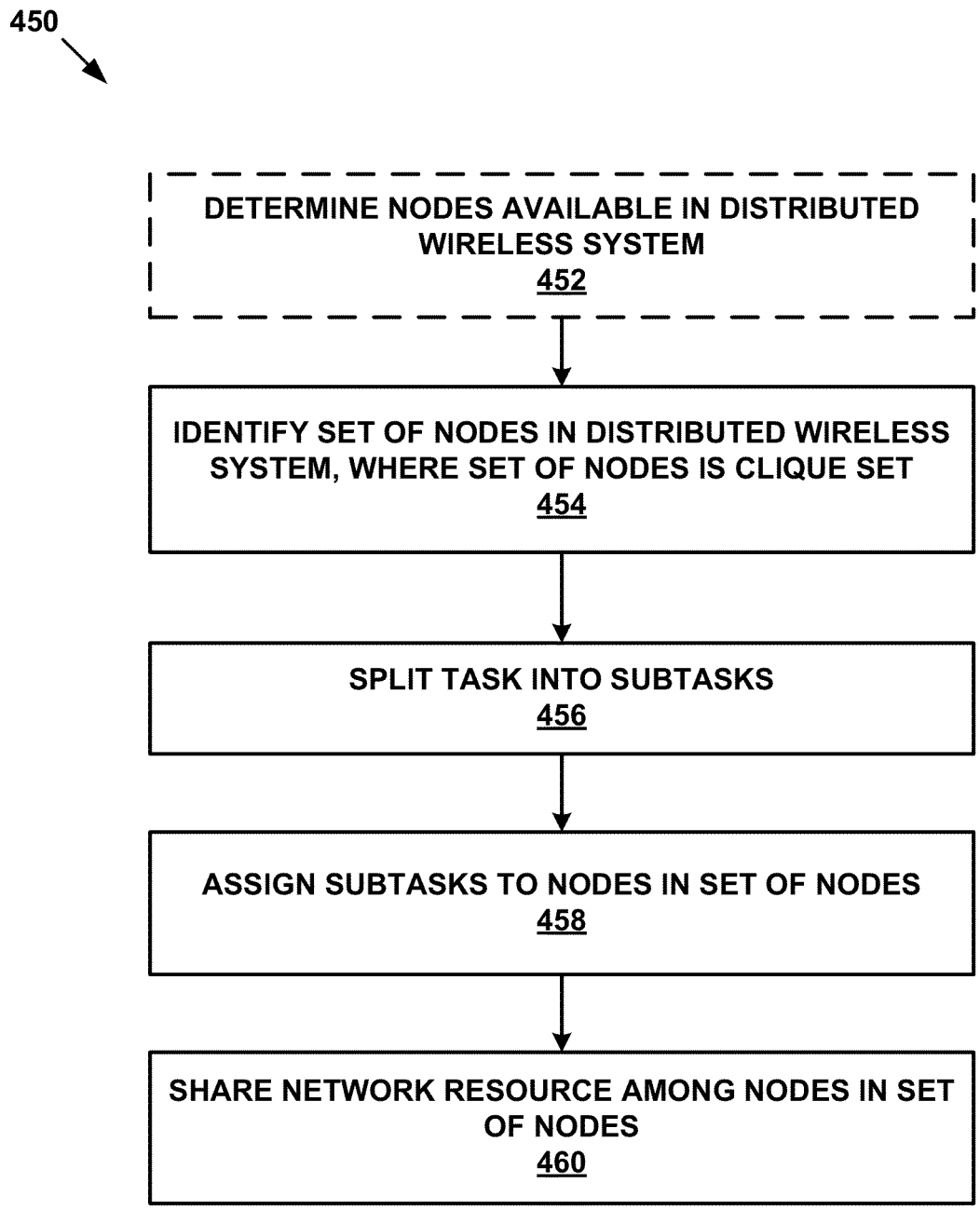
FIG. 4B illustrates another exemplary process for processing tasks and sharing network resource according to embodiments of the present disclosure.

FIG. 4B is a flowchart illustrating another exemplary process 450 for processing tasks and sharing network resource according to embodiments of the present disclosure. During operation, the clique identification module 302 optionally determines nodes available in a distributed wireless system (operation 452). Operation 452 is depicted using a dashed line to indicate it is an optional feature in the exemplary process 450. The clique identification module 302 identifies a set of nodes in the distributed wireless system, where the set of nodes is a clique set including one or more nodes (operation 454). An exemplary process 500 for performing operation 454 is described below in more detail with reference to FIGS. 5A-5D. The task processing module 316 splits a task into subtasks (operation 456), and assigns the subtasks to nodes in the set of nodes (operation 458). In some embodiments, each node performs at least one subtask. The task processing module 316 shares network resource among the nodes in the clique set (operation 460).

Figure 5A:
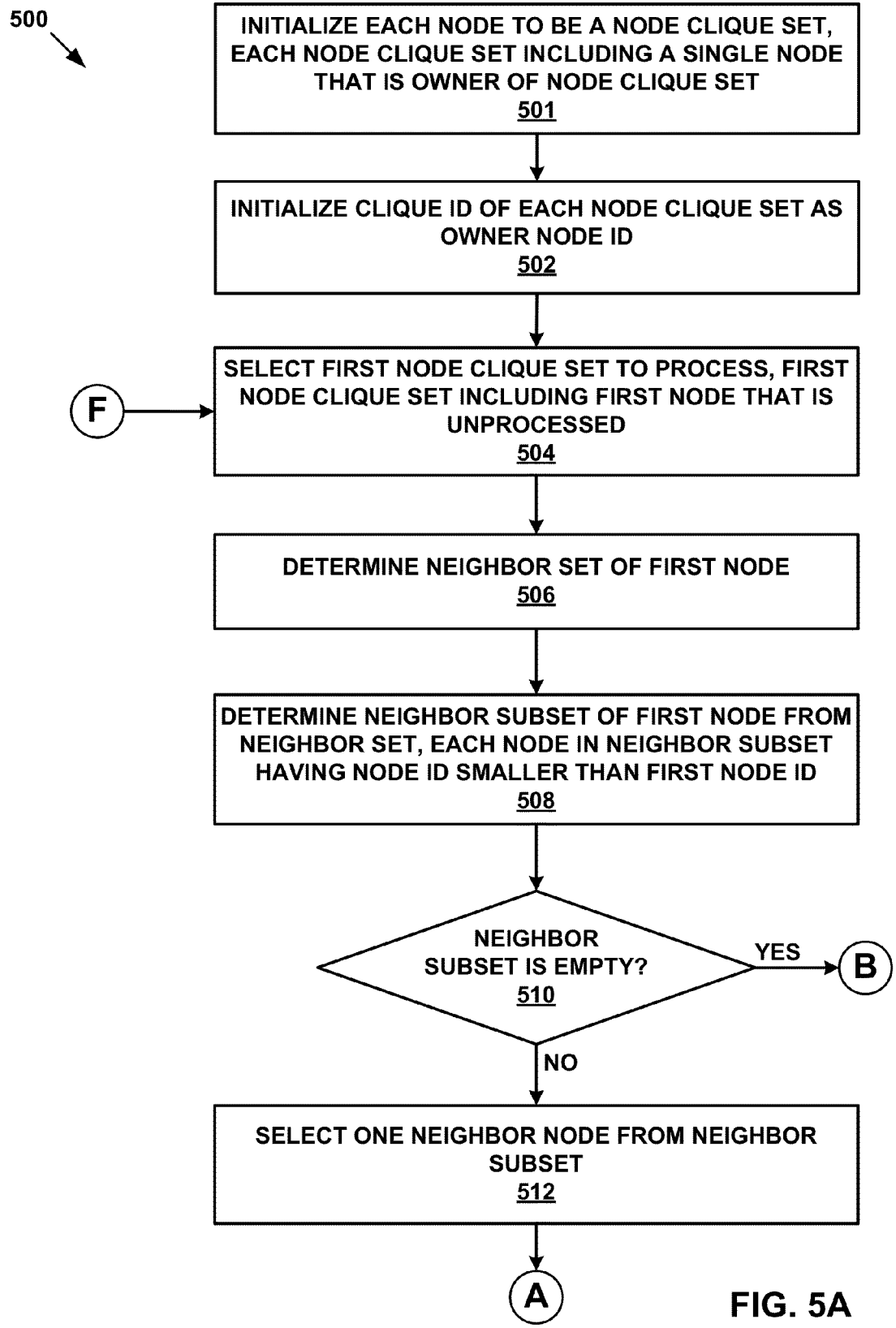
FIGS. 5A-5D illustrate an exemplary process for identifying clique sets according to embodiments of the present disclosure.

FIGS. 5A-5D are flowcharts illustrating an exemplary process 500 for identifying clique sets according to embodiments of the present disclosure. Referring to FIG. 5A, the initialization module 304 initializes each node to be a node clique set in a distributed wireless system, where each node clique set includes the single node which is also the owner node of the node clique set (operation 501). The initialization module 304 initializes a clique ID of each node clique set as the owner node ID (operation 502). The clique discovery module 306 selects a first node clique set to process from the node clique sets (operation 504). The first node clique set includes a first node that is unprocessed. The clique discovery module 306 determines a neighbor set of the first node that includes all the neighbor nodes of the first node (operation 506). The clique discovery module 306 determines a neighbor subset of the first node from the neighbor set, where each node in the neighbor subset has a node ID smaller than the first node ID (operation 508). The clique discovery module 306 determines whether the neighbor subset is an empty set (operation 510). If the neighbor subset is an empty set, the exemplary process 500 moves to operation 544 at FIG. 5D. Otherwise, the exemplary process 500 moves to operation 512. At operation 512, the clique discovery module 306 selects one neighbor node from the neighbor subset. For example, the clique discovery module 306 selects a neighbor node with a lowest node ID among all the neighbor nodes that are not yet processed in the neighbor subset.

Figure 5B:
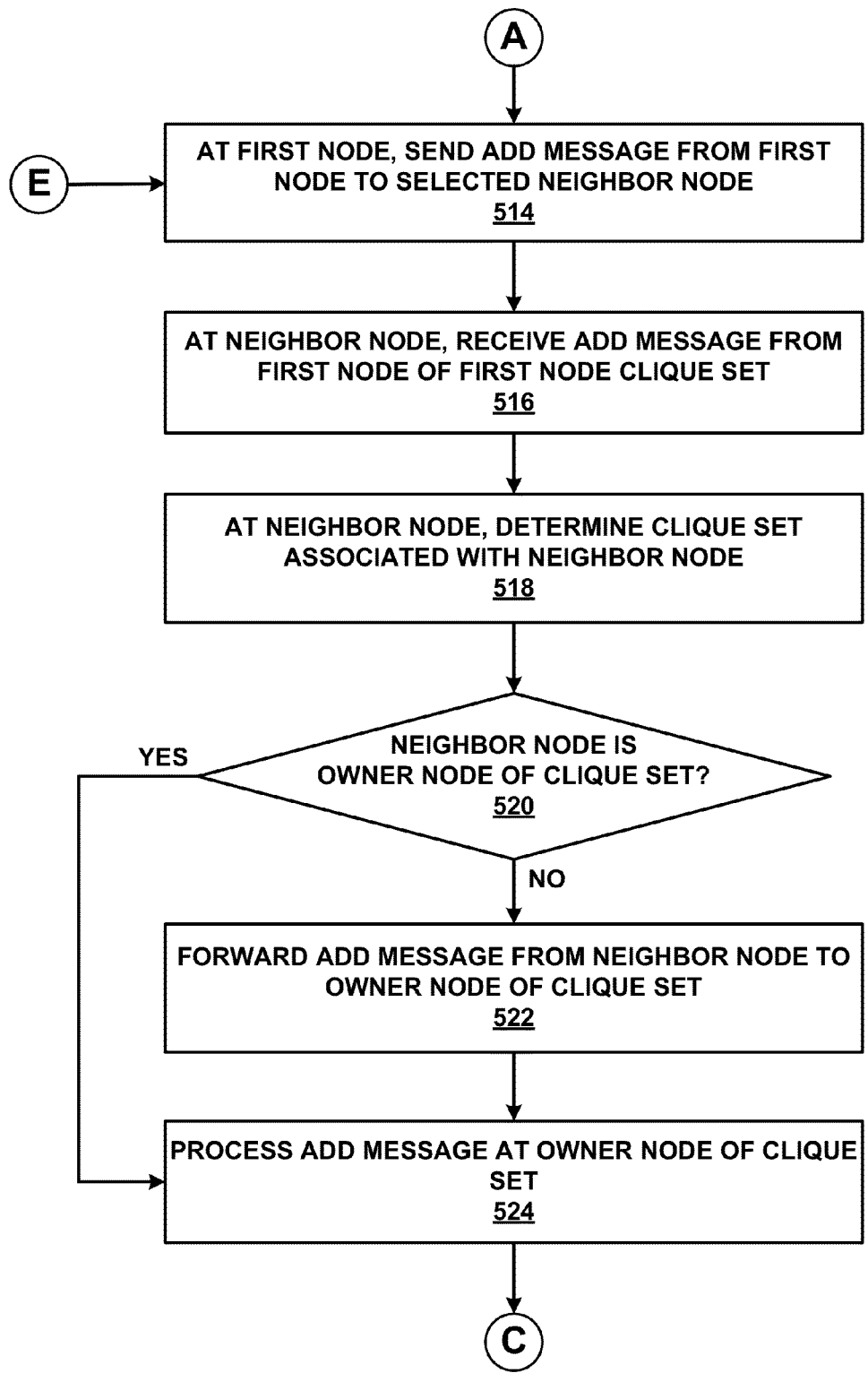

Referring to FIG. 5B, the clique discovery module 306 sends an ADD message from the owner node of the first clique set to the selected neighbor node (operation 514). At the selected neighbor node, the ADD processing module 308 receives the ADD message from the owner node of the first clique set (operation 516). At the neighbor node, the ADD processing module 308 determines a clique set associated with the neighbor node (operation 518). The ADD processing module 308 determines whether the neighbor node is the owner node of the clique set (operation 520). If the neighbor node is the owner node of the clique set, the exemplary process 500 moves to operation 524. Otherwise, the exemplary process 500 moves to operation 522. At operation 522, the ADD processing module 308 forwards the ADD message from the neighbor node to the owner node of the clique set. The ADD processing module 308 processes the ADD message at the owner node of the clique set (operation 524).

Figure 5C:
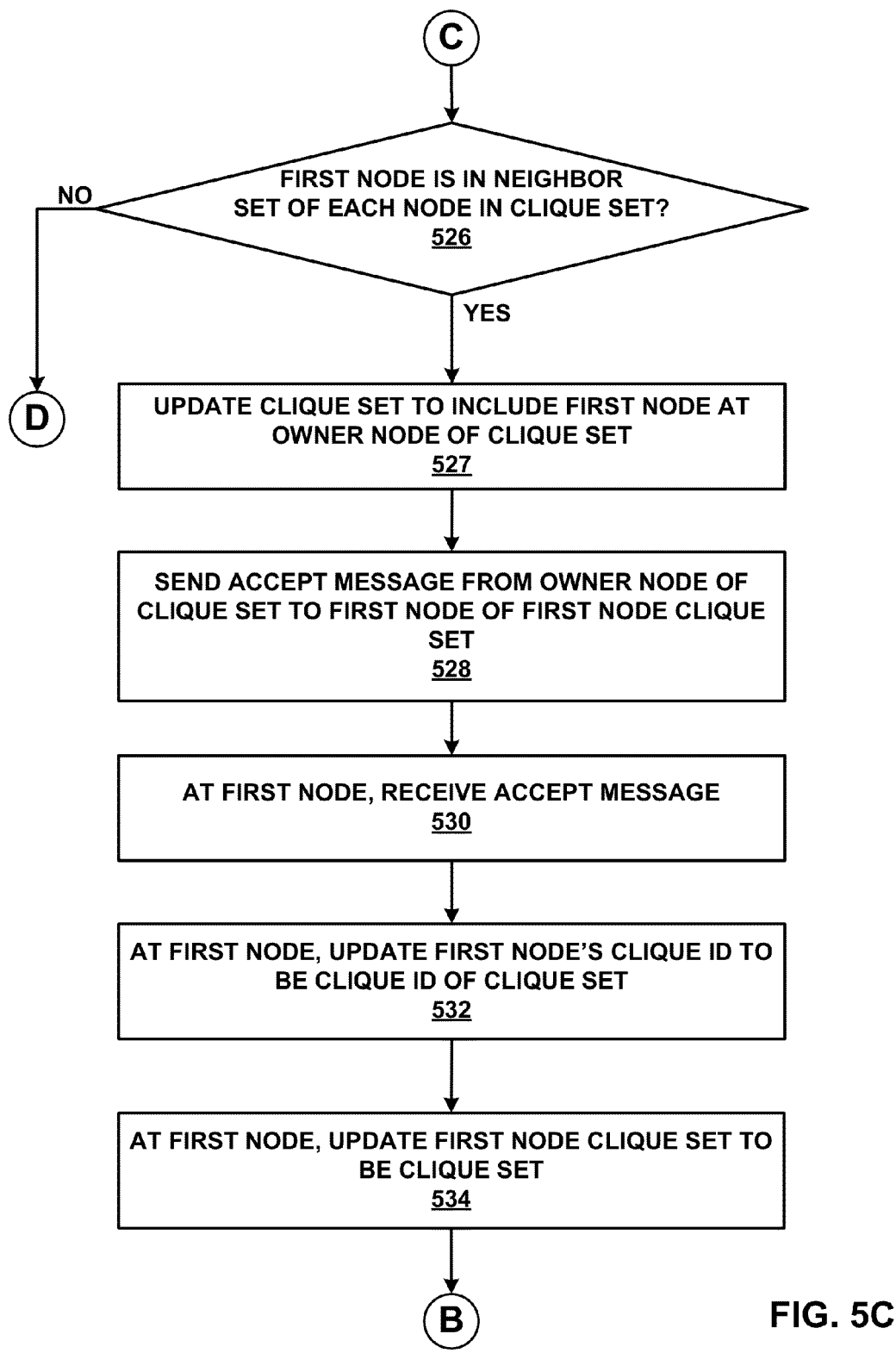

Referring to FIG. 5C, the ADD processing module 308 determines whether the first node from the first node clique set is in the neighbor set of each node from the clique set (operation 526). For example, the ADD processing module 308 determines whether the first node is a neighbor of every node in the clique set. In another example, the ADD processing module 308 determines whether the first node is connected to each node of the clique set in a graph. If the first node is in the neighbor set of each node from the clique set, the exemplary process 500 moves to operation 527. Otherwise, the exemplary process 500 moves to operation 536 at FIG. 5D.

At operation 527, the ACCEPT processing module 310 updates the clique set at the owner node of the clique set. For example, the ACCEPT processing module 310 combines the node clique set including the first node and the clique set including the neighbor node together to form an updated clique set. The ACCEPT processing module 310 generates and sends an ACCEPT message from the owner node of the clique set to the first node of the node clique set (operation 528). For example, the ACCEPT processing module 310 sends the ACCEPT message directly to the first node of the node clique set. In another example, the ACCEPT processing module 310 sends the ACCEPT message to the first node of the node clique set via the selected neighbor node. The ACCEPT processing module 310 receives the ACCEPT message at the first node of the first clique set (operation 530). The ACCEPT processing module 310 updates the clique ID at the first node to be the clique ID of the clique set (operation 532). At the first node, the ACCEPT processing module 310 also updates the first node clique set to be the clique set that is updated at operation 527 (operation 534). The exemplary process 500 moves to operation 544. The updated clique sets at the first node and the owner node of the clique set are the same clique set, having the same clique ID, the same owner node and the same member nodes.

Figure 5D:
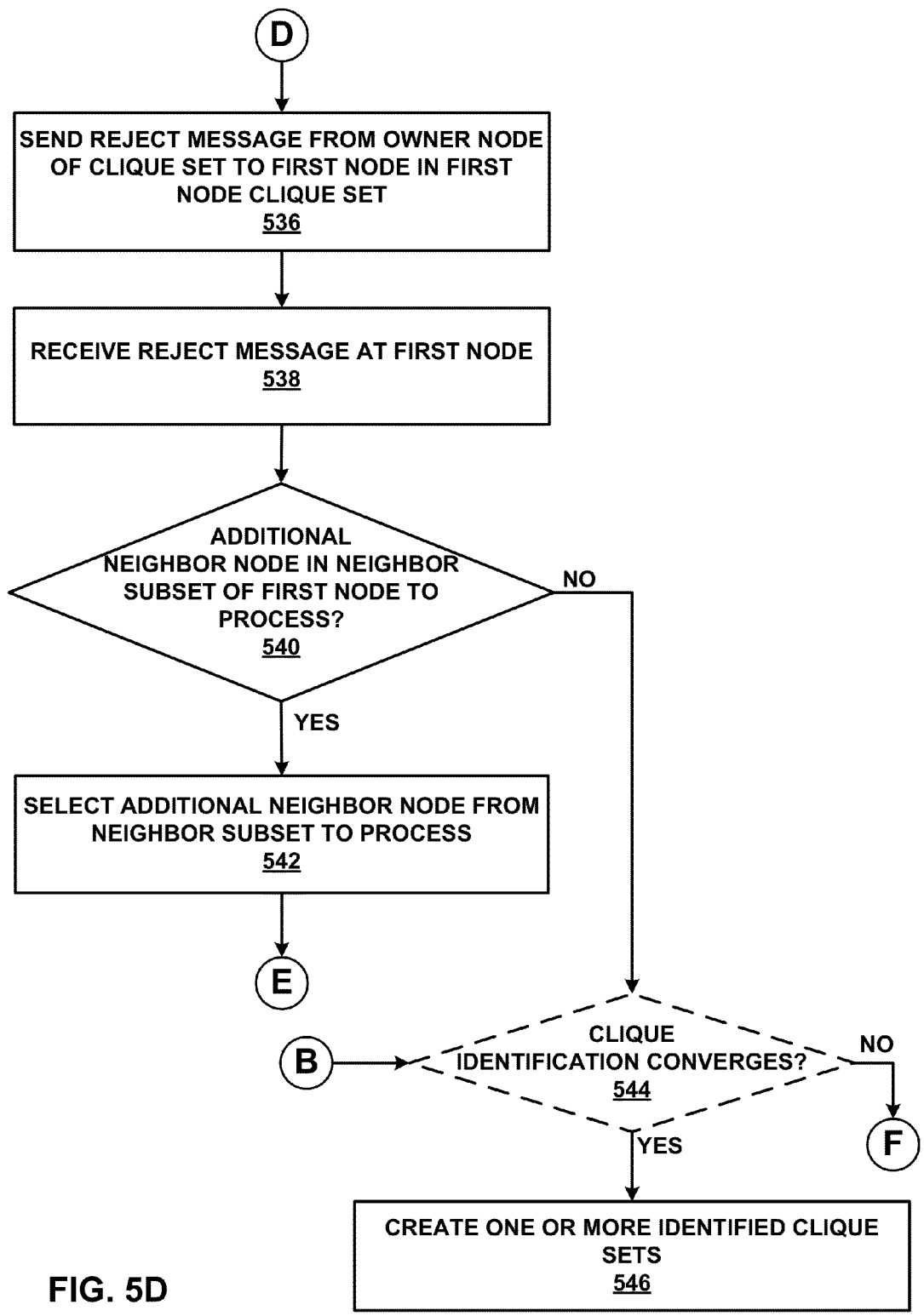

Referring to FIG. 5D, the ADD processing module 308 sends a REJECT message from the owner node of the clique set to the first node of the first node clique set either directly or via the neighbor node (operation 536). The REJECT processing module 312 receives the REJECT message at the first node (operation 538). The REJECT processing module 312 determines whether there are additional neighbor nodes in the neighbor subset of the first node to be processed, where the additional neighbor nodes are remaining nodes in the neighbor subset of the first node that have not yet been processed (operation 540). If there is at least one additional neighbor node in the neighbor subset to be processed, the exemplary process 500 moves to operation 542. Otherwise, the exemplary process 500 moves to operation 544. At operation 542, the clique discovery module 306 selects an additional neighbor node to be processed from the remaining neighbor nodes in the neighbor subset. For example, the clique discovery module 306 selects a neighbor node with the lowest node ID from all the remaining neighbor nodes. The exemplary process 500 moves back to operation 514 at FIG. 5B.

Turning to operation 544, the clique discovery module 306 determines whether the identification process for clique sets converges. Operation 544 is depicted using a dashed line to indicate that it is an optional feature of the process 500. If the identification process for clique sets converges, the clique discovery module 306 determines one or more unique updated clique sets that exist at the convergence of the identification process, and creates one or more identified clique sets as the one or more unique clique sets (operation 546). Otherwise, the exemplary process 500 moves back to operation 504 at FIG. 5A for selecting another node clique set to process.

Figure 6:
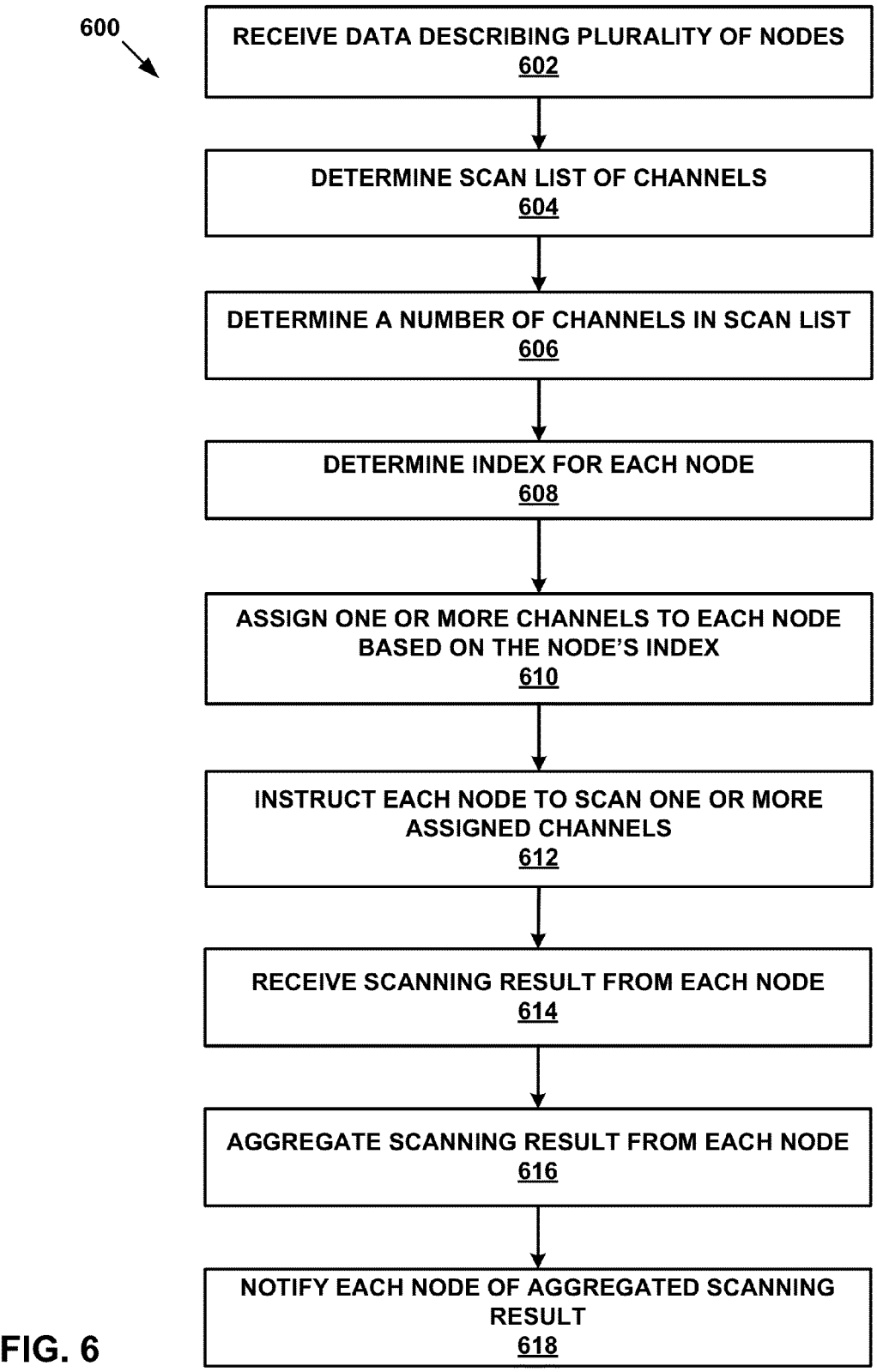
FIG. 6 illustrates an exemplary process for performing a channel scanning task according to embodiments of the present disclosure.

FIG. 6 is a flowchart illustrating an exemplary process 600 for performing channel scanning according to embodiments of the present disclosure. In some embodiments, the task processing module 316 receives data describing a plurality of nodes from the neighborhood identification module 301 (operation 602). In some embodiments, the task processing module 316 receives an identified clique set that includes a plurality of nodes from the clique identification module 302. The task processing module 316 determines a scan list of channels to be scanned by the plurality of nodes (operation 604), and determines a number of channels in the scan list (operation 606). For example, the task processing module 316 determines that there are a total number of "L" channels to be scanned, where the first channel is indexed by the number "0," the second channel is indexed by the number "1," so on and so forth, and the last channel is indexed by the number "L−1." The task processing module 316 determines a number of nodes in the plurality of nodes. For example, the task processing module 316 determines there are a total number of "P" nodes in the plurality of nodes. The task processing module 316 determines an index for each node in the plurality of nodes (operation 608). For example, the task processing module 316 ranks the nodes according to an ascending order or descending order of the node IDs, and assigns an index "I" to each node based on the order of the ranked nodes. An index "I" is an integer with 1≤I≤P. For example, a node with the highest ranking is assigned with an index "1," a node with the second highest ranking is assigned with an index "2," so on and so forth. The node with the lowest ranking is assigned with an index "P."

The task processing module 316 assigns one or more channels to each node based on the node's index (operation 610). For example, for any node with the index "I" with 1≤I<P, the task processing module 316 assigns the channels that are indexed from $$\left\lfloor \frac{L}{P} \right\rfloor \times (I-1) \text{ to } \left\lfloor \frac{L}{P} \right\rfloor \times I$$

to the node; for the node with the index "I=P," the task processing module 316 assigns the channels that are indexed from $$\left\lfloor \frac{L}{P} \right\rfloor (P-1) \text{ to } \left\lfloor \frac{L}{P} \right\rfloor \times P + L \% P,$$

where the symbol ⌊ ⌋ represents a floor function and the symbol % represents a remainder operator. For example, assume the plurality of nodes includes P=3 nodes with indices 1, 2 and 3, and the scan list includes L=7 channels with indices 0, 1, 2, 3, 4, 5 and 6. The first node with index I=1 is assigned with channels having indices 0 and 1; the second node with index I=2 is assigned with channels having indices 2 and 3; and the third node with index I=3 is assigned with channels having indices 4, 5 and 6.

The task processing module 316 instructs each node to scan the one or more channels assigned to the node (operation 612). The task processing module 316 receives a channel scanning result from each node (operation 614), and aggregates the channel scanning result from each node to generate an aggregated scanning result (operation 616). The task processing module 316 notifies each node of the aggregated scanning result (operation 618).

It should be understood that the process 600 described herein is only for illustrative purposes and serving as an example approach to allocate and scan channels. There may be numerous other approaches to allocate and scan the channels.

The channel scanning mechanism described herein is beneficial in numerous respects. For example, by splitting the channel scanning task among a plurality of nodes, the time that each node spends on scanning the channels can be reduced. In this case, each node (e.g., an access point 160) can focus on serving clients 170 in a dynamically or statically assigned channel, without spending too much time on the channel scanning task. Furthermore, by splitting the channel scanning task, each channel in the list can also be scanned more frequently, which improves the wireless intrusion detection and prevention performance.

Figure 7:
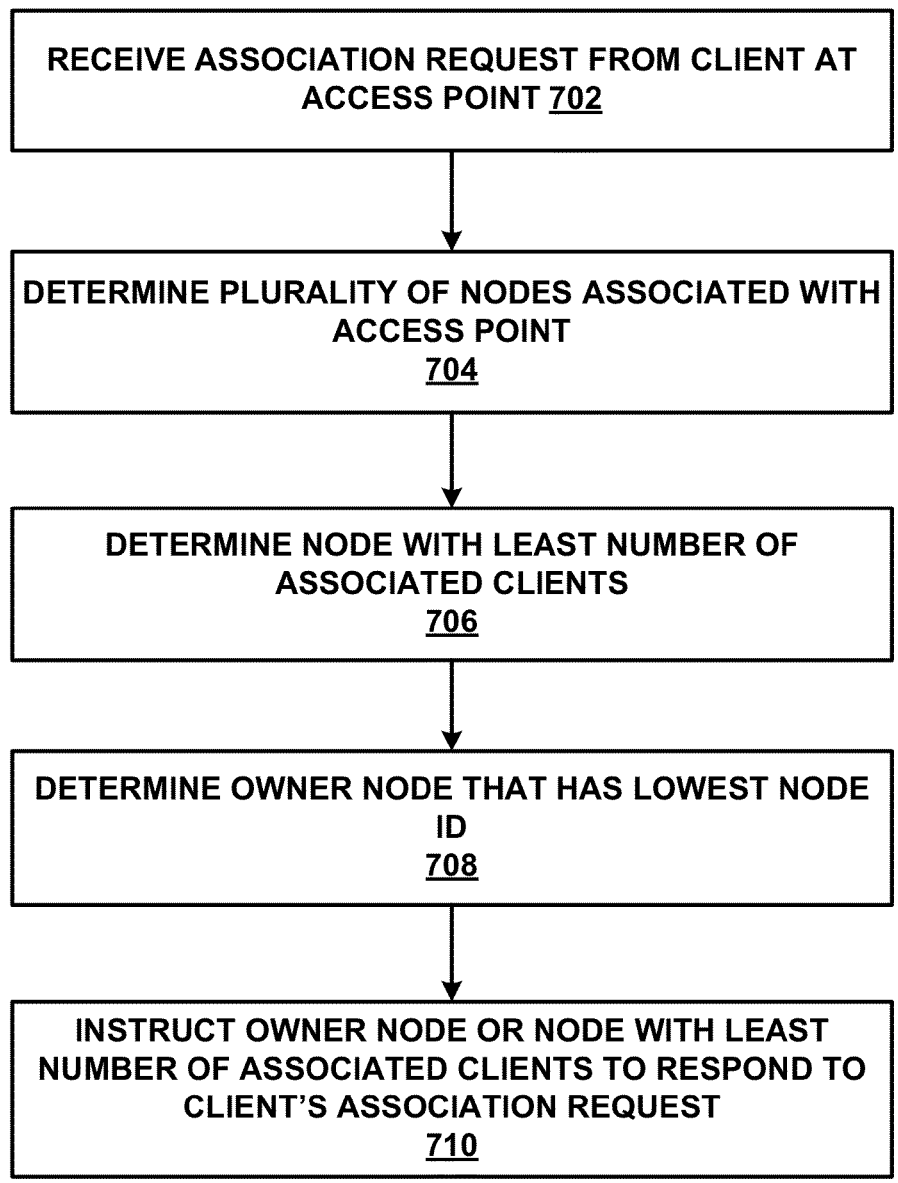
FIG. 7 illustrates an exemplary process for performing a load balancing task according to embodiments of the present disclosure.

FIG. 7 is a flowchart illustrating an exemplary process 700 for performing load balancing according to embodiments of the present disclosure. In some embodiments, the task processing module 316 receives an association request from a client 170 at an access point 160 (operation 702). The task processing module 316 determines a plurality of nodes associated with the access point 160 (operation 704). In some embodiments, the task processing module 316 determines a clique set that includes a plurality of nodes. For each node in the plurality of nodes, the task processing module 316 determines the number of clients 170 that are already associated with the node. For example, the task processing module 316 determines the number of associated clients 170 for each node through external mechanisms such as a report that complies with IEEE 802.11k standard or retrieving the relevant information from a central database on the cloud. The task processing module 316 determines a node with the least number of associated clients 170 from the plurality of nodes (operation 706). For example, the task processing module 316 determines a node with the minimal associated clients 170 in the plurality of nodes. The task processing module 316 determines an owner node of the plurality of nodes (operation 708). In some embodiments, the owner node has the lowest node ID in the plurality of nodes.

The task processing module 316 instructs either the owner node or the node with the least number of associated clients to respond to the client's 170 association request (operation 710). For example, the task processing module 316 instructs the node with the least number of associated clients to respond to the client's 170 association request, so that the spectrum load can be balanced among the plurality of nodes. In another example, the task processing module 316 uses the owner node as a fallback mechanism that can respond to the association request if the node with the least number of associated clients fails to respond to the association request.

The spectrum load balancing mechanism described herein is beneficial in numerous respects. For example, by distributing the association requests from clients 170 among the plurality of nodes, which is equivalent to balancing the clients 170 across the available channels, the system can use the resource of radio frequency bandwidth more efficiently and therefore improve network performance.

Graphic Representations

Figure 8B:
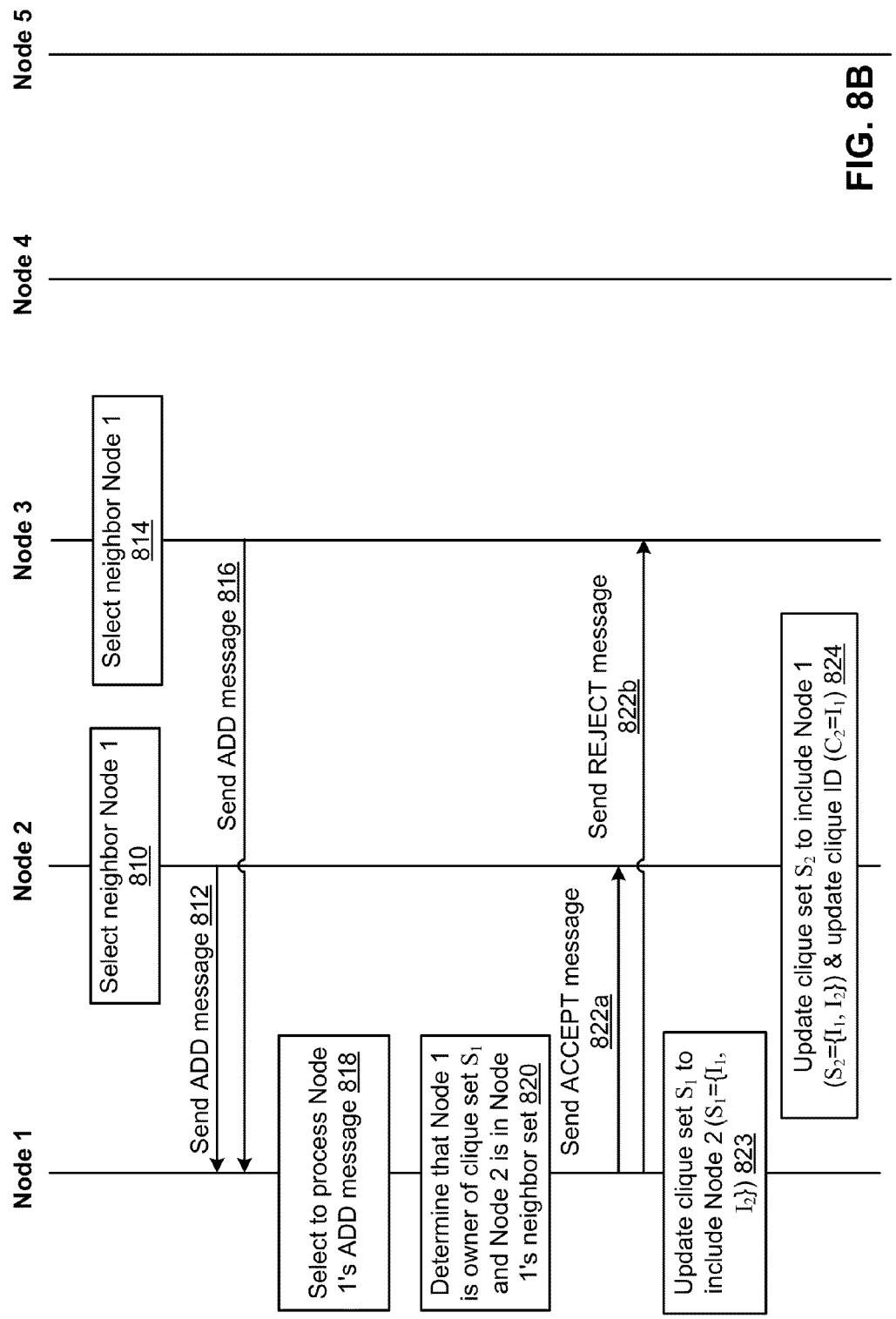

FIGS. 8A-8F are graphic representations illustrating an exemplary process for identifying clique sets according to embodiments of the present disclosure. Referring to FIG. 8A, an example graph 801 that includes 5 available nodes (Nodes 1, 2, 3, 4, 5) in a distributed wireless system is illustrated. For each node, Table 802 describes a node ID, a first neighbor set including all the neighbors of the node, and a second neighbor set including neighbors whose node IDs are smaller than the respective node ID. A neighbor of a node is another node in the graph that connects to the node directly. For example, Table 802 describes that Node 2 has a node ID $I_2=2$, a first neighbor set $R_2=\{1, 3, 5\}$ that includes Node 2's neighbors (Node 1, Node 3 and Node 5), and a second neighbor set $T2=\{1\}$ that includes Node 2's neighbor Node 1 having a node ID $I1=1$ smaller than Node 2's ID $I2=2$. Table 804 illustrates all the initialized clique sets generated from the example graph 801. After initialization, each node in the graph 801 forms a node clique set with a clique ID equal to the node ID, and the node serves as an owner node in the node clique set. For example, after initialization Node 2 forms a clique set $S2=\{I2\}$, with the clique ID $C2=I2$. Node 2 is the only node in the node clique set $S2=\{I2\}$ and serves as the owner node of the node clique set $S2=\{I2\}$.

FIGS. 8B-8E illustrate an exemplary update process for generating one or more identified clique sets from the initialized clique sets shown in Table 804. Referring to FIG. 8B, Node 2 selects a neighbor (Node 1) that has a node ID $I1=1$ smaller than Node 2's ID $I2=2$ (operation 810). Node 2 sends an ADD message to Node 1, requesting to join Node 1's clique set (operation 812). Node 3 also selects a neighbor (Node 1) that has a node ID $I1=1$ smaller than Node 3's ID $I3=3$ (operation 814). Node 3 sends another ADD message to Node 1, requesting to join Node 1's clique set (operation 816). Node 1 receives the two ADD messages from Node 2 and Node 3 respectively. Node 1 selects to process Node 1's ADD message and rejects Node 3's ADD message (operation 818), since Node 2's ID $I2=2$ is smaller than Node 3's ID $I3=3$.

Node 1 determines that Node 1 itself is the owner of the first clique set $S1=\{I1\}$ and Node 2 is in the neighbor set of Node 1 (e.g., Nodes 1 and 2 are neighbors) (operation 820). Node 1 generates and sends an ACCEPT message to Node 2 responsive to Node 2's ADD message (operation 822a). Node 1 updates the first clique set $S_1$ to include Node 2. For example, the first clique set $S_1$ is updated to be $S_1=\{I_1, I_2\}$ responsive to the ACCEPT message, and is stored on Node 1. Node 1 generates and sends a REJECT message to Node 3 (operation 822b) because Node 3's ADD message is rejected at Node 1. Node 2 updates the second clique set $S_2$ to include Node 1 and the corresponding clique ID responsive to receiving the ACCEPT message (operation 824). For example, the second clique set $S_2$ is updated to be $S_2=\{I_1, I_2\}$ with the updated clique ID $C_2=I_1$. The second clique set $S_2$ is stored on Node 2. At this stage, the first and second clique sets are updated to be the same clique set, $S_1=S_2=\{I_1, I_2\}$.

Figure 8C:
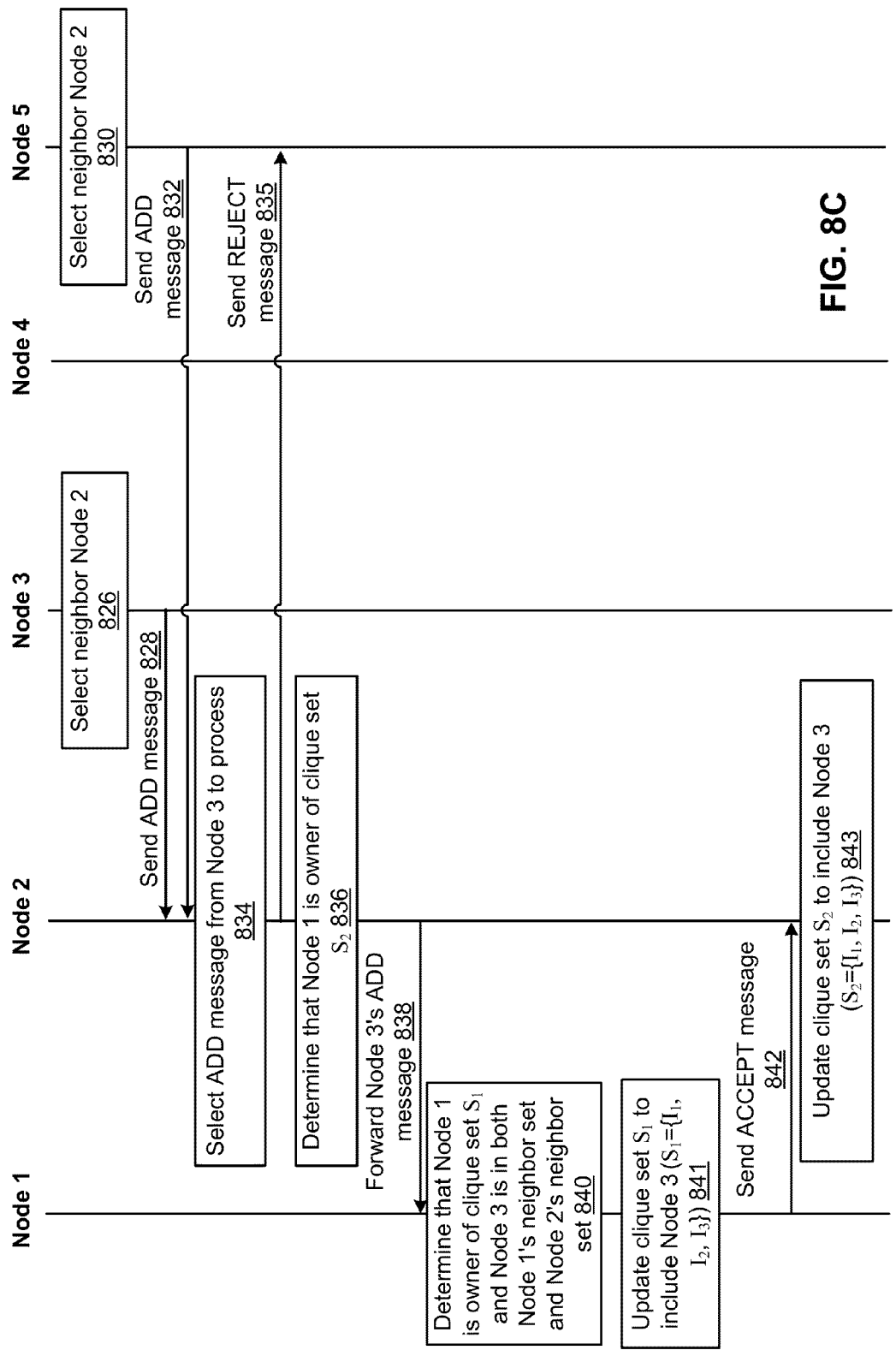

Referring to FIG. 8C, Node 3 selects a next neighbor (Node 2) that has a node ID $I_2=2$ smaller than Node 3's ID $I_3=3$ (operation 826). Node 3 sends an ADD message to Node 2, requesting to join Node 2's clique set (operation 828). Node 5 also selects a neighbor (Node 2) that has a node ID $I_2=2$ smaller than Node 5's ID $I_5=5$ (operation 830). Node 5 sends another ADD message to Node 2, requesting to join Node 2's clique set (operation 832). Node 2 receives the two ADD messages from Node 3 and Node 5 respectively. Node 2 selects to process Node 3's ADD message and ignores Node 5's ADD message (operation 834), since Node 3's node ID $I_3=3$ is smaller than Node 5's node ID $I_5=5$. Node 2 generates and sends a REJECT message to Node 5 (operation 835), because Node 5's ADD message is rejected at Node 2. Node 2 determines that Node 1 is the owner node of the second clique set S2 (operation 836), and forwards Node 3's ADD message to Node 1 (operation 838). Node 1 determines that Node 1 itself is the owner of the clique set $S1=S2=\{I1, I2\}$ and Node 3 is in both Node 1's neighbor set and Node 2's neighbor set (e.g., Nodes 1 and 2 are neighbors of Node 3) (operation 840). Node 1 generates an ACCEPT message responsive to Node 3's ADD message. Node 1 updates the first clique set S1 to include Node 3 (operation 841). For example, the first clique set S1 is updated to be $S1=\{I1, I2, I3\}$ responsive to the ACCEPT message, and is stored on Node 1. Node 1 sends the ACCEPT message to Node 2 (operation 842). Node 2 updates the second clique set S2 to include Node 3 responsive to receiving the ACCEPT message (operation 843). For example, the second clique set S2 is updated to be $S2=\{I1, I2, I3\}$.

Figure 8D:
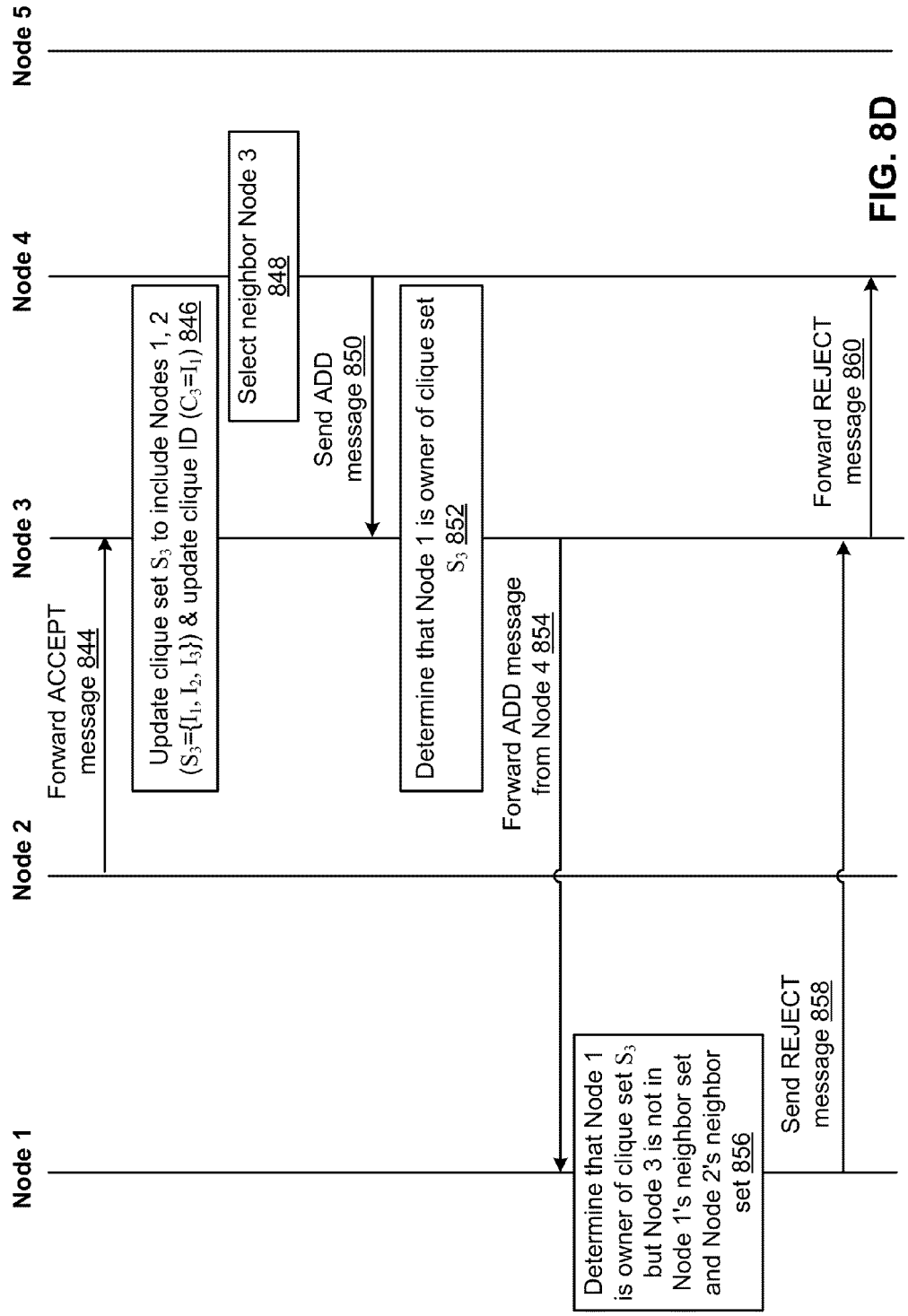

Referring to FIG. 8D, Node 2 forwards the ACCEPT message to Node 3 (operation 844). Node 3 updates the third clique set S3 to include Nodes 1 and 2 responsive to receiving the ACCEPT message (operation 846). For example, the third clique set S3 is updated to be $S3=\{I1, I2, I3\}$ with the updated clique ID $C3=I1$. The third clique set S3 is stored on Node 3. At this stage, the first, second and third clique sets are updated to be the same clique set, $S1=S2=S3=\{I1, I2, I3\}$.

Next, Node 4 selects a neighbor (Node 3) that has a node ID $I3=3$ smaller than Node 4's ID $I4=4$ (operation 848). Node 4 sends an ADD message to Node 3, requesting to join Node 3's clique set (operation 850). Node 3 receives the ADD message from Node 4. Node 3 determines that Node 1 is the owner node of the third clique set S3 (operation 852), and forwards Node 4's ADD message to Node 1 (operation 854). Node 1 determines that Node 1 itself is the owner of the clique set $S1=S2=S3=\{I1, I2, I3\}$ but Node 4 is not in Node 1's neighbor set and Node 2's neighbor set (e.g., Nodes 1 and 2 are not neighbors of Node 4) (operation 856). Node 1 generates a REJECT message and sends the REJECT message to Node 3 (operation 858), causing Node 3 to forward the REJECT message to Node 4 (operation 860).

Figure 8E:
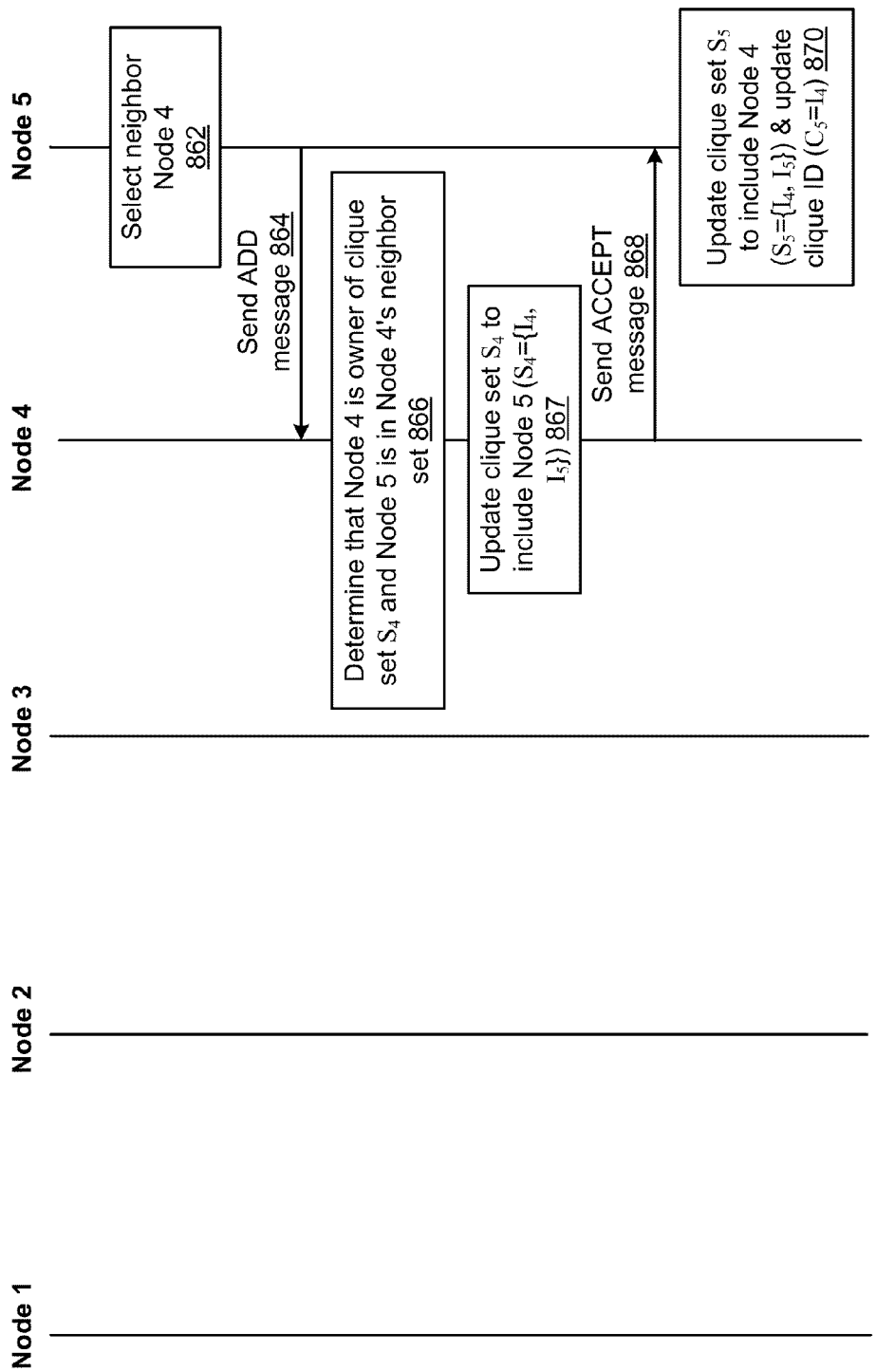

Referring to FIG. 8E, Node 5 selects a neighbor (Node 4) that has a node ID $I4=4$ smaller than Node 5's ID $I5=5$ (operation 862). Node 5 sends an ADD message to Node 4, requesting to join Node 4's clique set (operation 864). Node 4 determines that Node 4 itself is the owner of the fourth clique set $S4=\{I4\}$ and Node 5 is in the neighbor set of Node 4 (e.g., Nodes 4 and 5 are neighbors) (operation 866). Node 4 generates an ACCEPT message responsive to Node 5's ADD message. Node 4 updates the fourth clique set S4 to include Node 5 (operation 867). For example, the fourth clique set S4 is updated to be $S4=\{I4, I5\}$ responsive to the ACCEPT message, and is stored on Node 4. Node 4 sends the ACCEPT message to Node 5 (operation 868). Node 5 updates the fifth clique set S5 to include Node 4 responsive to receiving the ACCEPT message (operation 870). For example, the fifth clique set S5 is updated to be $S5=\{I4, I5\}$ with the updated clique ID $C5=I4$. The fifth clique set S5 is stored on Node 5. At this stage, the fourth and fifth clique sets are updated to be the same clique set, $S4=S5=\{I4, I5\}$.

Figure 8F:
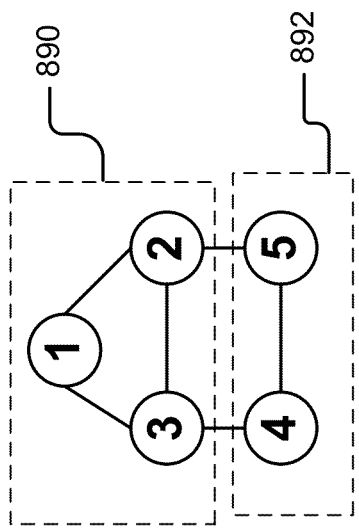

Referring to FIG. 8F, two unique clique sets are identified for the example graph 801, including a first clique set 890 (e.g., $S1=S2=S3=\{I1, I2, I3\}$) and a second clique set 892 (e.g., $S4=S5=\{I4, I5\}$). As illustrated in Table 880, a clique ID for the first identified clique set 890 is I1; the owner node of the first identified clique set 890 is Node 1; and the first identified clique set 890 has three member nodes (Nodes 1, 2 and 3). A clique ID for the second identified clique set 892 is I4; the owner node of the second identified clique set 892 is Node 4; and the second identified clique set 892 has two member nodes (Nodes 4 and 5).

Figure 9A:
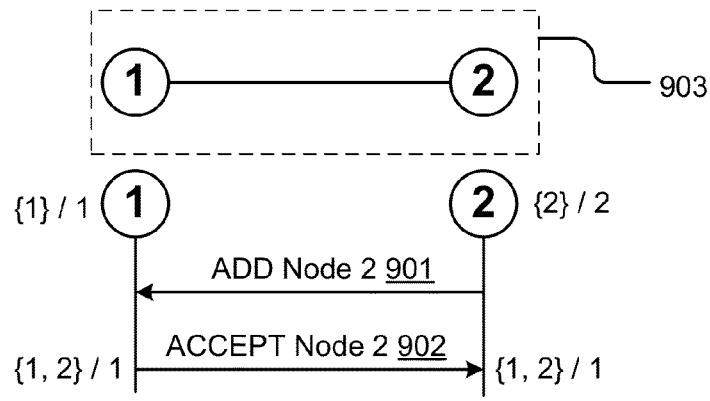
FIGS. 9A-9F are graphic representations illustrating additional processes for identifying exemplary clique sets according to embodiments of the present disclosure.

FIGS. 9A-9F are graphic representations illustrating additional processes for identifying exemplary clique sets according to embodiments of the present disclosure. Referring to FIG. 9A, an example graph including Node 1 and Node 2 that connect to each other by an edge is illustrated. During initialization, two node clique sets are generated, including a first node clique set {1} with the owner node as Node 1 (represented as {1}/1) and a second node clique set {2} with the owner node as Node 2 (represented as {2}/2). After initialization, Node 2 sends an ADD message to Node 1 (operation 901), since Node 1 is a neighbor of Node 2 and has a node ID smaller than Node 2's ID. Node 1 accepts Node 2 to join its own clique set and sends an ACCEPT message to Node 2 (operation 902). Node 1 updates its own clique set to include Node 2. For example, Node 1 updates its own clique set to be {1,2}/1, where the node IDs within the bracket "{ }" represent member nodes of the clique set and the node ID following "/" represents the owner node ID. Node 2 updates its own clique set to include Node 1. For example, Node 2 updates its own clique set to be {1,2}/1. Thus, a clique set 903 including Nodes 1 and 2 is identified.

Figure 9B:
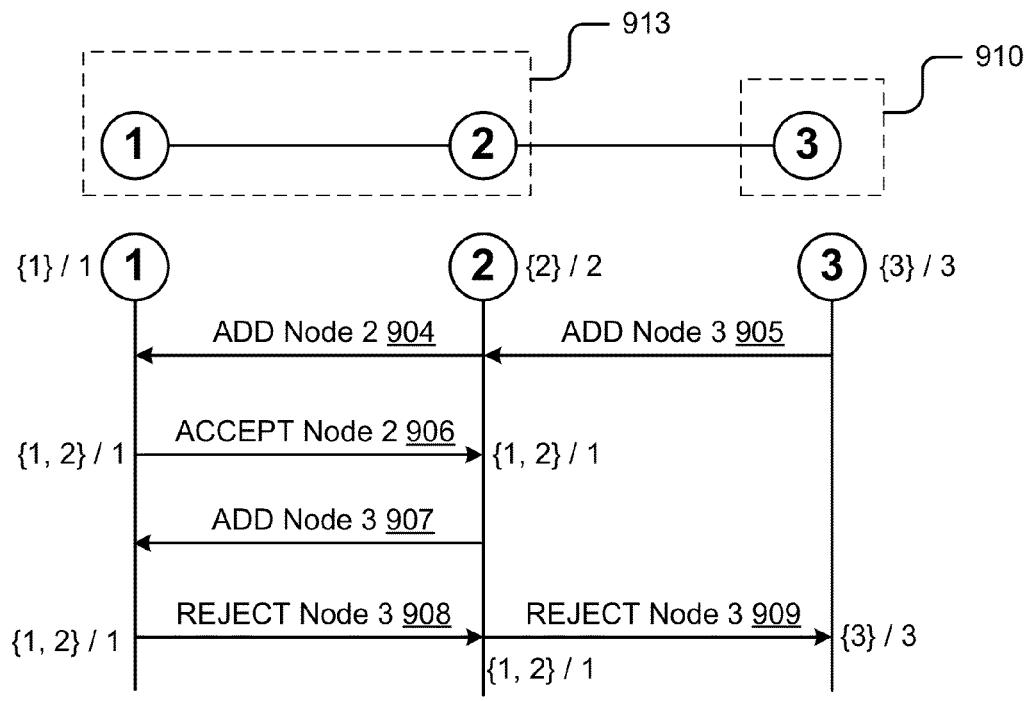

Referring to FIG. 9B, an example graph including Nodes 1, 2 and 3 is illustrated, where Nodes 1 and 3 connect to Node 2 respectively. During initialization, three node clique sets are generated, including {1}/1, {2}/2 and {3}/3. After initialization, Node 2 sends an ADD message to Node 1 (operation 904), since Node 1 is a neighbor of Node 2 and has a node ID smaller than Node 2's ID. Node 3 sends an ADD message to Node 2 (operation 905), since Node 2 is a neighbor of Node 3 and has a node ID smaller than Node 3's ID. Node 1 accepts Node 2 to join its own clique set and sends an ACCEPT message to Node 2 (operation 906). Node 1 updates its own clique set to include Node 2. For example, Node 1 updates its own clique set to be {1,2}/1. Node 2 updates its own clique set to include Node 1. For example, Node 2 updates its own clique set to be {1,2}/1. Afterwards, Node 2 forwards Node 3's ADD message received at operation 905 to Node 1 (operation 907). Node 1 rejects Node 3 to join its own clique set since Node 3 is not a neighbor of Node 1. Node 1 sends an REJECT message to Node 2 (operation 908), causing Node 2 to forward the REJECT message to Node 3 (operation 909). Thus, a first clique set 913 including Nodes 1 and 2 and a second clique set 910 including Node 3 are identified.

Figure 9C:
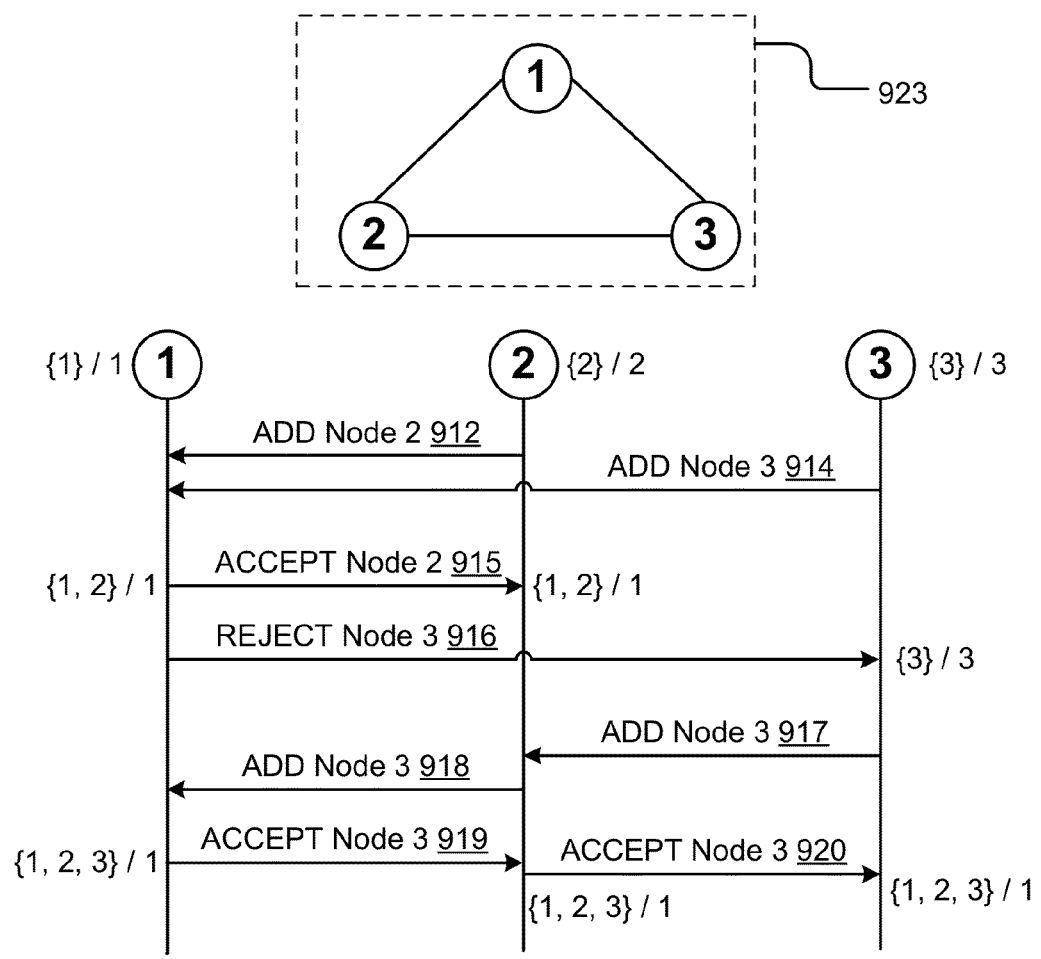

Referring to FIG. 9C, an example graph including Nodes 1, 2 and 3 is illustrated, where Nodes 1, 2 and 3 are pairwise connected to each other. During initialization, three node clique sets are generated, including {1}/1, {2}/2 and {3}/3. After initialization, Node 2 sends an ADD message to Node 1 (operation 912), since Node 1 is a neighbor of Node 2 and has a node ID smaller than Node 2's ID. Node 3 sends an ADD message to Node 1 (operation 914), since Node 1 is a neighbor of Node 3 and has a node ID smaller than Node 3's ID. Node 1 accepts Node 2 to join its own clique set and sends an ACCEPT message to Node 2 (operation 915). Node 1 rejects Node 3 and sends a REJECT message to Node 3 (operation 916), since Node 1 selects to process the ADD message received from Node 2. Node 1 updates its own clique set to include Node 2. For example, Node 1 updates its own clique set to be {1,2}/1. Node 2 updates its own clique set to include Node 1. For example, Node 2 updates its own clique set to be {1,2}/1. Afterwards, Node 3 sends an ADD message to Node 2 (operation 917), since Node 2 is another neighbor of Node 3 and has a node ID smaller than Node 3's ID. Node 2 forwards Node 3's ADD message to Node 1 (operation 918). Node 1 accepts Node 3 to join its own clique set since Node 3 is also a neighbor of Node 1. Node 1 sends an ACCEPT message to Node 2 (operation 919), causing Node 2 to forward the ACCEPT message to Node 3 (operation 920). Nodes 1, 2 and 3 each update the corresponding clique set to be {1, 2, 3}/1, respectively. Thus, a clique set 923 including Nodes 1, 2 and 3 is identified.

Figure 9D:
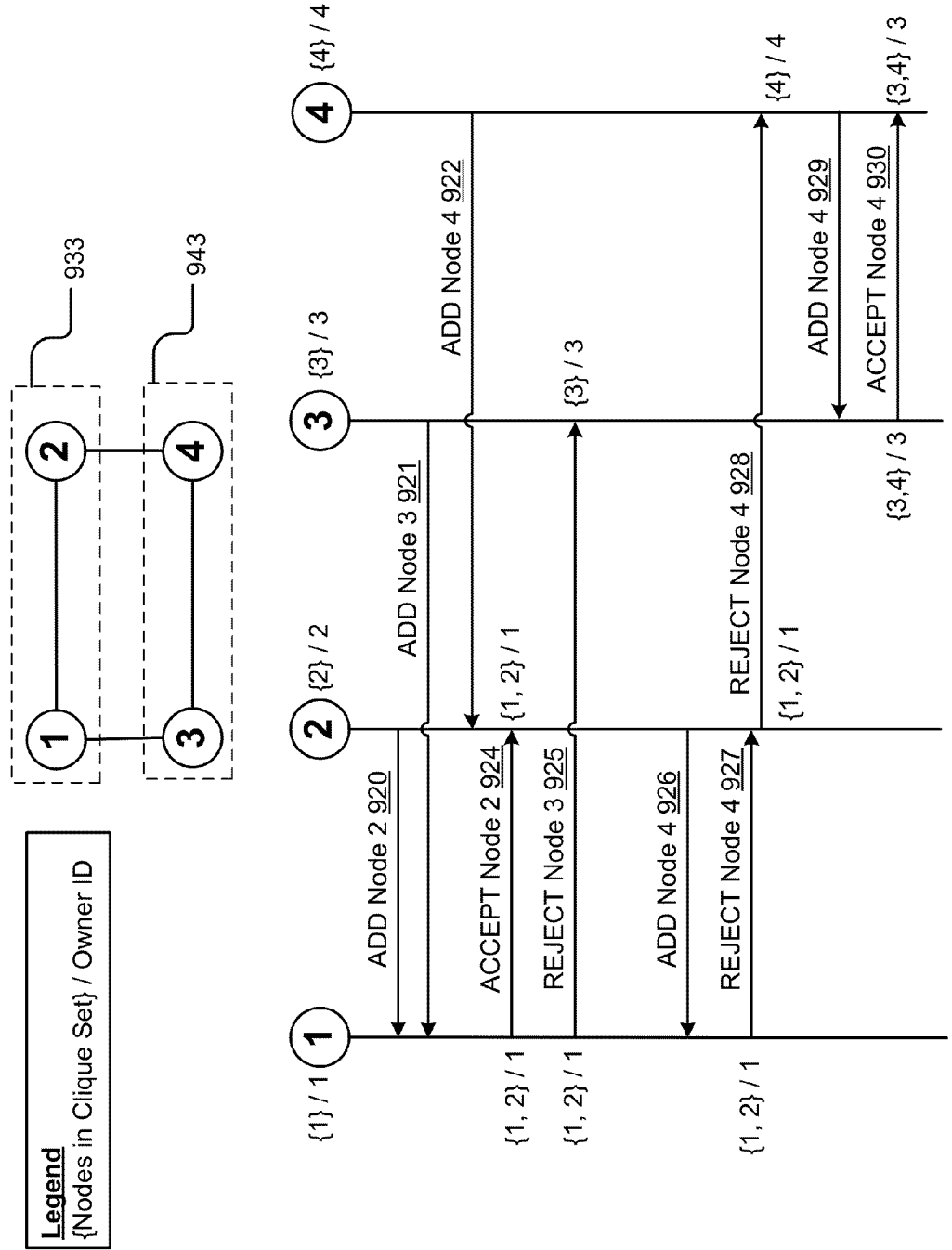

Referring to FIG. 9D, an example graph including Nodes 1, 2, 3 and 4 is illustrated, where Node 1 is connected to Node 2, Node 2 is connected to Node 4, Node 4 is connected to Node 3 and Node 3 is connected to Node 1. During initialization, four node clique sets are generated, including {1}/1, {2}/2, {3}/3 and {4}/4. After initialization, Node 2 sends an ADD message to Node 1 (operation 920), since Node 1 is a neighbor of Node 2 and has a node ID smaller than Node 2's ID. Node 3 sends an ADD message to Node 1 (operation 921), since Node 1 is a neighbor of Node 3 and has a node ID smaller than Node 3's ID. Node 4 sends an ADD message to Node 2 (operation 922), since Node 2 is a neighbor of Node 4 and has a node ID smaller than Node 4's ID. Node 1 accepts Node 2 to join its own clique set and sends an ACCEPT message to Node 2 (operation 924). Node 1 rejects Node 3 and sends a REJECT message to Node 3 (operation 925), since Node 1 selects to process the ADD message received from Node 2. Nodes 1 and 2 each update its own clique set to be {1, 2}/1, respectively.

Afterwards, Node 2 forwards Node 4's ADD message received at operation 922 to Node 1 (operation 926). Node 1 reject Node 4 to join its own clique set since Node 4 is not a neighbor of Node 1. Node 1 sends an REJECT message to Node 2 (operation 927), causing Node 2 to forward the REJECT message to Node 4 (operation 928). Next, Node 4 sends an ADD message to Node 3, which is another neighbor of Node 4 (operation 929). Node 3 accepts Node 4 to join its own clique set and sends an ACCEPT message to Node 4 (operation 930). Nodes 3 and 4 each update its own clique set to be {3, 4}/3, respectively. Thus, a first clique set 933 including Nodes 1 and 2 and a second clique set 943 including Nodes 3 and 4 are identified.

Figure 9E:
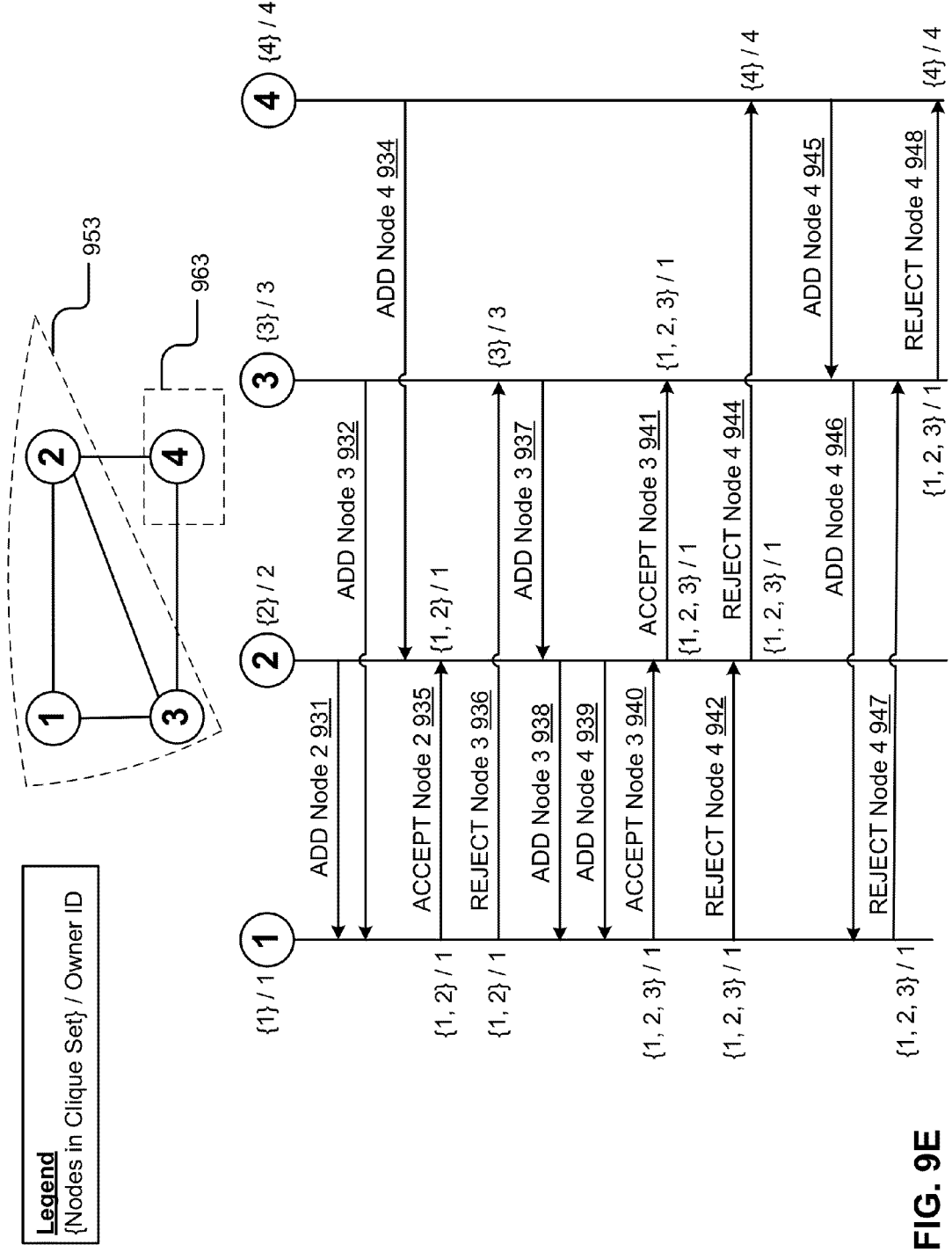

Referring to FIG. 9E, an example graph including Nodes 1, 2, 3 and 4 is illustrated, where Nodes 1, 2 and 3 are pairwise connected to each other and Node 4 is connected to Nodes 2 and 3. During initialization, four node clique sets are generated, including {1}/1, {2}/2, {3}/3 and {4}/4. After initialization, Node 2 sends an ADD message to Node 1 (operation 931), since Node 1 is a neighbor of Node 2 and has a node ID smaller than Node 2's ID. Node 3 sends an ADD message to Node 1 (operation 932), since Node 1 is a neighbor of Node 3 and has a node ID smaller than Node 3's ID. Node 4 sends an ADD message to Node 2 (operation 934), since Node 2 is a neighbor of Node 4 and has a node ID smaller than Node 4's ID. Node 1 accepts Node 2 to join its own clique set and sends an ACCEPT message to Node 2 (operation 935). Node 1 rejects Node 3 and sends a REJECT message to Node 3 (operation 936), since Node 1 selects to process the ADD message received from Node 2. Nodes 1 and 2 each update its own clique set to be {1, 2}/1, respectively.

Next, Node 2 receives an ADD message from Node 3 (operation 937), and forwards Node 3's ADD message to Node 1 (operation 938). Node 2 also forwards Node 4's ADD message received at operation 934 to Node 1 (operation 939). Node 1 accepts Node 3 to join its own clique set and sends an ACCEPT message to Node 2 (operation 940), causing Node 2 to forward the ADD message to Node 3 (operation 941). Nodes 1, 2 and 3 each update its own clique set to be {1, 2, 3}/1. Node 1 rejects Node 4's ADD message since Node 1 selects to process Node 3's ADD message. Node 1 sends an REJECT message to Node 2 (operation 942), causing Node 2 to forward the REJECT message to Node 4 (operation 944).

Next, Node 4 sends an ADD message to Node 3, which is another neighbor of Node 4 (operation 945). Node 3 forwards Node 4's ADD message to Node 1 (operation 946). Node 1 rejects Node 4 to join its own clique set since Node 4 is not a neighbor of Node 1. Node 1 sends an REJECT message to Node 3 (operation 947), causing Node 3 to forward the REJECT message to Node 4 (operation 948). Thus, a first clique set 953 including Nodes 1, 2 and 3 and a second clique set 963 including Node 4 are identified.

Figure 9F:
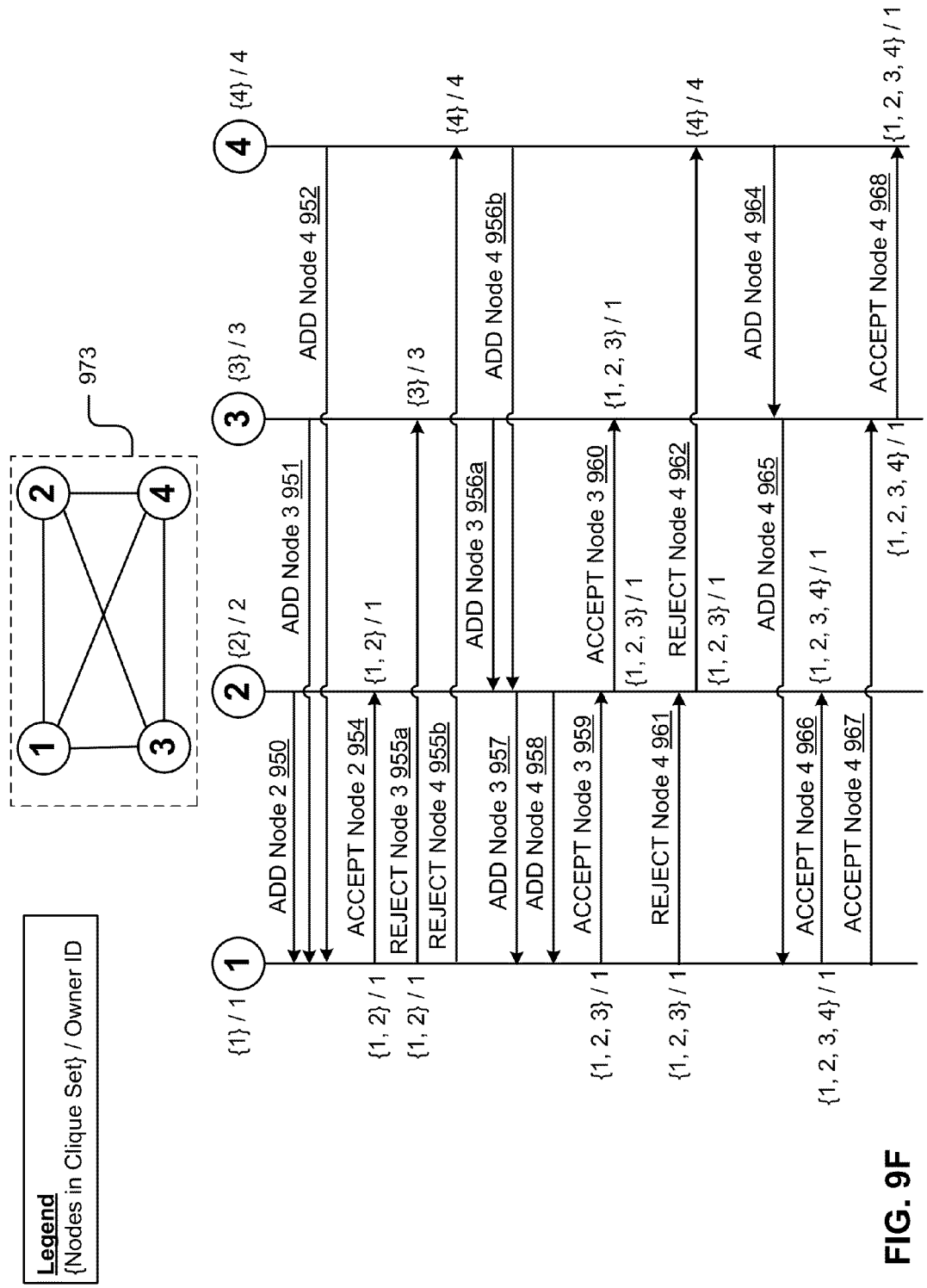

Referring to FIG. 9F, an example graph including Nodes 1, 2, 3 and 4 is illustrated, where Nodes 1, 2, 3 and 4 are pairwise connected to each other. During initialization, four node clique sets are generated, including {1}/1, {2}2, {3}3 and {4}/4. After initialization, Node 1 is waiting for ADD requests from its neighbor nodes that are in Node 1's neighbor set, where the neighbor nodes have node IDs greater than Node 1's ID. In some embodiments, Node 1 does not start to process ADD requests until receiving all the ADD messages from its neighbor nodes with node IDs greater than Node 1's ID. In some embodiments, Node 1 does not start to process ADD requests until receiving one or more ADD messages from Node 1's neighbor nodes whose node IDs are (1) greater than Node 1's ID and (2) the lowest IDs in Node 1's neighbor set and. Node 2 sends an ADD message to Node 1 (operation 950). Node 3 sends an ADD message to Node 1 (operation 951). Node 4 sends an ADD message to Node 1 (operation 952). Node 1 accepts Node 2 to join its own clique set and sends an ACCEPT message to Node 2 (operation 954). Nodes 1 and 2 each update its own clique set to be {1, 2}/1, respectively. Node 1 rejects Node 3 and sends a REJECT message to Node 3 (operation 955a), since Node 1 selects to process the ADD message received from Node 2. Node 1 also rejects Node 4 and sends a REJECT message to Node 4 (operation 955b).

Next, Node 2 receives an ADD message from Node 3 (operation 956a) and an ADD message from Node 4 (operation 956b). Node 2 forwards Node 3's ADD message to Node 1 (operation 957). Node 2 forwards Node 4's ADD message received at operation 956b to Node 1 (operation 958). Node 1 accepts Node 3 to join its own clique set and sends an ACCEPT message to Node 2 (operation 959), causing Node 2 to forward the ADD message to Node 3 (operation 960). Nodes 1, 2 and 3 each update its own clique set to be {1, 2, 3}/1. Node 1 rejects Node 4's ADD message since Node 1 already selects to process Node 3's ADD message. Node 1 sends an REJECT message to Node 2 (operation 961), causing Node 2 to forward the REJECT message to Node 4 (operation 962).

Next, Node 4 sends an ADD message to Node 3, which is another neighbor of Node 4 (operation 964). Node 3 forwards Node 4's ADD message to Node 1 (operation 965). Node 1 accepts Node 4 to join its own clique set since Node 4 is also a neighbor of Nodes 1 and 2. In other words, Node 4 is a neighbor of all the nodes in the clique set {1, 2, 3}/1. Node 1 updates its own clique set to be {1, 2, 3, 4}/1. Node 1 sends an ACCEPT message to Node 2 (operation 966), causing Node 2 to update its own clique set to be {1, 2, 3, 4}/1. Node 1 sends the ACCEPT message to Node 3 (operation 967), causing Node 3 to forward the ACCEPT message to Node 4 (operation 968). Nodes 3 and 4 each update its own clique set to be {1, 2, 3, 4}/1, respectively. Thus, a clique set 973 including Nodes 1, 2, 3 and 4 is identified.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A computer-implemented method comprising:
   identifying a plurality of nodes in a distributed wireless system, wherein each node of the plurality of nodes is associated with a radio frequency neighborhood, and wherein the radio frequency neighborhood of one node includes one or more other nodes that receive beacons from the one node;
   assigning a task to the plurality of nodes;
   splitting the task into a plurality of subtasks;
   assigning the plurality of subtasks to the plurality of nodes;
   receiving a plurality of subtask processing results from the plurality of nodes; and
   combining the plurality of subtask processing results to generate a task processing result for the task.

2. The method of claim 1, wherein each two nodes in the plurality of nodes are radio frequency neighbors.

3. The method of claim 1, wherein the task is a channel scanning task, and wherein splitting the task comprises:
   determining a list of channels to be scanned; and
   splitting the list of channels among the plurality of nodes with each node scanning at least one channel from the list of channels.

4. The method of claim 1, wherein the task is a load balancing task, and splitting the task comprises:
   receiving an association request from a first client;
   determining a number of associated clients for each node in the plurality of nodes;
   determining a first node with a minimal number of associated clients from the plurality of nodes;
   determining an owner node of the plurality of nodes; and
   instructing one of the first node and the owner node to respond to the association request from the first client.

5. The method of claim 1, wherein the plurality of nodes is identified manually.

6. The method of claim 1, wherein the plurality of nodes is identified automatically.

7. The method of claim 6, wherein identifying a plurality of nodes comprises identifying a clique set that includes the plurality of nodes.

8. The method of claim 7, wherein the clique set is represented using a graph, and wherein each node is represented as a vertex in the graph, and further wherein every two nodes in the plurality of nodes are connected to each other by an edge in the graph.

9. The method of claim 7, wherein identifying the clique set comprises:
   initializing one or more node clique sets in the distributed wireless system; and
   exchanging one or more of an ADD message, an ACCEPT message and a REJECT message between the one or more node clique sets to create the clique set.

10. A system comprising:
    a processor; and
    a memory storing instructions that, when executed by the processor, cause the processor to:
       identify a plurality of nodes in a distributed wireless system, wherein each node of the plurality of nodes associated with a radio frequency neighborhood, and wherein the radio frequency neighborhood of one node includes one or more other nodes that receive beacons from the one node;
       assign a task to the plurality of nodes;
       split the task into a plurality of subtasks;

assign the plurality of subtasks to the plurality of nodes;
receive a plurality of subtask processing results from the plurality of nodes; and
combine the plurality of subtask processing results to generate a task processing result for the task.

11. The system of claim 10, wherein each two nodes in the plurality of nodes are radio frequency neighbors.

12. The system of claim 10, wherein the task is a channel scanning task, and wherein to split the task, the instructions are further to cause the processor to:
determine a list of channels to be scanned; and
split the list of channels among the plurality of nodes with each node scanning at least one channel from the list of channels.

13. The system of claim 10, wherein the task is a load balancing task, and wherein to split the task, the instructions cause the processor to:
receive an association request from a first client;
determined a number of associated clients for each node in the plurality of nodes;
determine a first node with a minimal number of associated clients from the plurality of nodes;
determine an owner node of the plurality of nodes; and
instruct one of the first node and the owner node to respond to the association request from the first client.

14. The system of claim 10, wherein the plurality of nodes is identified manually.

15. The system of claim 10, wherein the plurality of nodes is identified automatically.

16. The system of claim 15, wherein to identify a plurality of nodes, the instructions cause the processor to identify a clique set that includes the plurality of nodes.

17. The system of claim 16, wherein the clique set is represented using a graph, and wherein each node is represented as a vertex in the graph, and further wherein every two nodes in the plurality of nodes are connected to each other by an edge in the graph.

18. The system of claim 16, wherein to identify the clique set, the instructions cause the processor to:
initialize one or more node clique sets in the distributed wireless system; and
exchange one or more of an ADD message, an ACCEPT message and a REJECT message between the one or more node clique sets to create the clique set.

19. A non-transitory computer-readable storage medium storing embedded instructions for a plurality of operations which, when executed by one or more mechanisms implemented within one or more network devices, cause the one or more mechanisms to:
identify a plurality of nodes in a distributed wireless system, wherein each node of the plurality of nodes associated with a radio frequency neighborhood, and wherein the radio frequency neighborhood of one node includes one or more other nodes that receive beacons from the one node;
assign a task to the plurality of nodes;
splits the task into a plurality of subtasks;
assign the plurality of subtasks to the plurality of nodes;
receive a plurality of subtask processing results from the plurality of nodes; and
combine the plurality of subtask processing results to generate a task processing result for the task.

20. The computer-readable storage medium of claim 19, wherein each two nodes in the plurality of nodes are radio frequency neighbors.

21. The computer-readable storage medium of claim 19, wherein the task is a channel scanning task, and wherein to split the task the embedded instructions are further to cause the one or more mechanisms to:
determine a list of channels to be scanned; and
split the list of channels among the plurality of nodes with each node scanning at least one channel from the list of channels.

22. The computer-readable storage medium of claim 19, wherein the task is a load balancing task, and wherein to split the task the embedded instructions are further to cause the one or more mechanisms to:
receive an association request from a first client;
determine a number of associated clients for each node in the plurality of nodes;
determine a first node with a minimal number of associated clients from the plurality of nodes;
determine an owner node of the plurality of nodes; and
instruct one of the first node and the owner node to respond to the association request from the first client.

23. The computer-readable storage medium of claim 19, wherein the plurality of nodes is identified manually.

24. The computer-readable storage medium of claim 19, wherein the plurality of nodes is identified automatically.

25. The computer-readable storage medium of claim 24, wherein to identify a plurality of nodes, the embedded instructions are further to cause the one or more mechanisms to identify a clique set that includes the plurality of nodes.

26. The computer-readable storage medium of claim 25, wherein the clique set is represented using a graph, and wherein each node is represented as a vertex in the graph, and further wherein every two nodes in the plurality of nodes are connected to each other by an edge in the graph.

27. The computer-readable storage medium of claim 25, wherein to identify the clique set the embedded instructions are further to cause the one or more mechanisms to:
initialize one or more node clique sets in the distributed wireless system; and
exchange one or more of an ADD message, an ACCEPT message and a REJECT message between the one or more node clique sets to create the clique set.

* * * * *

UNITED STATES PATENT AND TRADEMARK OFFICE
CERTIFICATE OF CORRECTION

PATENT NO. : 9,292,837 B2
APPLICATION NO. : 13/959603
DATED : March 22, 2016
INVENTOR(S) : Manoj Gupta et al.

Page 1 of 1

It is certified that error appears in the above-identified patent and that said Letters Patent is hereby corrected as shown below:

Claims

In column 25, line 19, in Claim 13, delete "determined" and insert -- determine --, therefor.

In column 26, line 2, in Claim 19, delete "splits" and insert -- split --, therefor.

Signed and Sealed this
Fifth Day of July, 2016

Michelle K. Lee
*Director of the United States Patent and Trademark Office*